United States Patent [19]

Baumann et al.

[11] Patent Number: 4,820,806
[45] Date of Patent: Apr. 11, 1989

[54] METAL-FREE AZO COMPOUNDS CONTAINING A VINYLSULFONYL GROUP AND AT LEAST ONE BASIC GROUP AND 1:1 AND 1:2 METAL COMPLEXES THEREOF

[75] Inventors: Werner Baumann, Charlotte, N.C.; Joseph V. Diest, Binningen; Herbert Eichenberger, Kaiseraugst, both of Switzerland; Max Oppliger, Allschwil, Switzerland

[73] Assignee: Sandoz, Ltd., Basle, Switzerland

[21] Appl. No.: 847,405

[22] PCT Filed: Jun. 25, 1985

[86] PCT No.: PCT/EP85/00305
  § 371 Date: Feb. 28, 1986
  § 102(e) Date: Feb. 28, 1986

[87] PCT Pub. No.: WO86/00632
  PCT Pub. Date: Jan. 30, 1986

[30] Foreign Application Priority Data

Jul. 2, 1984 [DE] Fed. Rep. of Germany ....... 3424320

[51] Int. Cl.$^4$ ............... C09B 62/507; C09B 62/51; C09B 62/513; C09B 62/515
[52] U.S. Cl. ................. 534/605; 534/602; 534/603; 534/604; 534/606; 534/612; 534/615; 534/629; 534/641; 534/642; 534/588; 534/887; 534/589
[58] Field of Search ............... 534/603, 604, 605, 606, 534/607, 610, 613, 627, 642, 612, 615, 641

[56] References Cited

U.S. PATENT DOCUMENTS

| 3,939,141 | 2/1976 | Meininger et al. | 534/629 |
| 3,998,805 | 12/1976 | Koller et al. | 534/641 |
| 4,000,966 | 1/1977 | Meininger et al. | 534/629 X |
| 4,002,606 | 1/1977 | Schlafer et al. | 534/603 X |

FOREIGN PATENT DOCUMENTS

| 771658 | 11/1967 | Canada | 534/642 |
| 0043575 | 1/1982 | European Pat. Off. | 534/642 |
| 0073481 | 3/1983 | European Pat. Off. | 534/642 |
| 1263438 | 5/1961 | France | 534/640 |
| 2088394 | 1/1972 | France | 534/629 |
| 47-15473 | 5/1972 | Japan . | |
| 50-2724 | 1/1975 | Japan | 534/642 |
| 1027570 | 4/1966 | United Kingdom | 534/643 |
| 1336612 | 11/1973 | United Kingdom | 534/629 |

Primary Examiner—Floyd D. Higel
Attorney, Agent, or Firm—Gerald D. Sharkin; Richard E. Vila; Melvyn M. Kassenoff

[57] ABSTRACT

Metal-free monoazo and disazo compounds of the formula

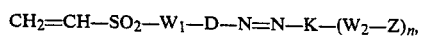

$$CH_2=CH-SO_2-W_1-D-N=N-K-(W_2-Z)_n,$$

1:1 and 1:2 metal complexes of such metallizable metal-free compounds and acid addition salts of such metal-free compounds and 1:1 and 1:2 metal complexes, wherein D is the radical of a diazo component of the benzene, naphthalene or tetrahydronaphthalene series, K is the radical of a coupling component of the benzene, naphthalene, pyrazol-5-one, pyridine, pyridone, barbituric acid, quinoline, isoquinoline, benzeneazobenzene, benzeneazonaphthalene, naphthaleneazobenzene, naphthaleneazonaphthalene, tetrahydronaphthaleneazobenzene, tetrahydronaphthaleneazonaphthalene or acetoacetamide series, $W_1$ is a direct bond or a divalent bridging radical,
each $W_2$ is independently a divalent bridging radical,
each Z is independently a water-solubilizing protonatable amino group, a quaternary ammonium group, a hydrazinium group or a ternary sulfonium group, and n is 1, 2, 3 or 4, are useful for dyeing and printing fibers, threads and textile materials, particularly those containing or consisting of natural or synthetic polyamide, cotton, polyacrylonitrile, leather or fiber blends such as cotton-polyester, polyester-wool and polyacrylonitrile-wool.

18 Claims, No Drawings

METAL-FREE AZO COMPOUNDS CONTAINING A VINYLSULFONYL GROUP AND AT LEAST ONE BASIC GROUP AND 1:1 AND 1:2 METAL COMPLEXES THEREOF

The invention relates to water-soluble azo compounds which contain basic groups and are free from sulphonic acid groups which compounds are metal-free or are in 1:1 or 1:2 metal complex form. These compounds are suitable for use as dyestuffs.

According to the invention there is provided monoazo and disazo compounds in metal-free form or in 1:1 or 1:2 metal complex form which in metal-free form correspond to formula I $$CH_2=CH-SO_2-W_1-D-N=N-K-(W_2-Z)_n \qquad I$$

in which
    D is the radical of a diazo component of the benzene, naphthalene or tetrahydronaphthalene series,
    K is the radical of a coupling component of the benzene, naphthalene, pyrazol-5-one, pyridine, pyridone, barbituric acid, quinoline, isoquinoline, benzene- or naphthalene- or tetrahydronaphthalene-azo-benzene or -azo-naphthalene, or of the acetoacetamide series,
    $W_1$ is a direct bond or a divalent bridging group,
    each $W_2$, independently, is a divalent bridging group,
    n is an integer 1 to 4,
    each Z, independently, is a water solubilising protonable amine group, a quaternary ammonium group, a hydrazinium group or a ternary sulphonium group,
        with the proviso that any Z containing a quaternary $N^{\oplus}$ directly bound to the carbon atom of a triazine or pyrimidine group which therefore constitutes part of a fibre-reactive grouping is excluded;
which compound is in free base form, salt form or acid addition salt form formed by the addition of dilute aqueous organic or mineral acids, and mixtures of compounds of formula I.

Preferably, D is the radical of a diazo component of the benzene or naphthalene series in which the group $-W_1-SO_2CH=CH_2$ is preferably bound in the 3- or 4-position of any phenyl group; on any naphthyl group $-W_1-SO_2CH=CH_2$ is particularly preferred in the 4-position. D is further unsubstituted or may contain one or two further substituents conventional in the chemistry of fibre-reactive azo compounds (with the exception of sulphonic acid groups) including any metallisable substituent in the ortho position to a carbon atom bound to the azo group, such as a hydroxy, amine, substituted amine, methoxy or carboxy group.

K is preferably the radical of a coupling component of the aminobenzene, phenol, aminophenol, aminonaphthalene, naphthol or aminonaphthol series or of the naphthalene series containing any other substituent enabling the coupling; of the 1-arylpyrazol-5-one, aminopyridine, hydroxypyridone, barbituric acid, N-alkyl or N-aryl substituted acetoacetamide, benzene- or naphthalene-azo-benzene, benzene-azo-naphthalene or tetrahydronaphthalene-azo-benzene series.

Additionally to the n groups —$W_2$—Z K is further unsubstituted or may contain one or two further substituents conventional in the chemistry of basic azo compounds including those substituents which enable the metallisation and therefore are in the ortho position to a carbon atom bound to the azo group.

n is preferably 1 or 2.

$W_1$ is preferably a direct bond; a $C_{1-6}$alkylene or $C_{2-6}$alkenylene group which groups are straight chain or branched, unsubtituted or monosubstituted by hydroxy, halogen, cyano, $C_{1-4}$alkoxy or phenyl and in which the carbon chains may be interrupted by one or two hetero atoms; —CONH—X—, —CO—X—, —SO$_2$NH—X—, —NHCO—x—, —NH—X— or —NHNHCO—X—, in which X is $C_{1-6}$alkylene or $C_{2-6}$alkenylene and which groups are bound to the —SO$_2$— group by a carbon atom of X; —CH$_2$CONHCH$_2$— or —CH$_2$NHCOCH$_2$—.

Each $W_2$, independently, has preferably one of the significances of $W_1$ except a direct bond where Z is attached to a carbon atom of X.

Each Z, independently, is preferably a water-solubilising protonatable amino group or a quaternary ammonium group; preferably Z is a primary amino group, a secondary or tertiary aliphatic, cycloaliphatic, aromatic or saturated or partially unsaturated heterocyclic amino group in which latter group the N-atom or a carbon atom is attached to $W_2$; or a quaternary ammonium group corresponding to the above.

In the specification any halogen means fluorine, chlorine, bromine or iodine, preferably chlorine or bromine.

The term "basic groups" also includes quaternary ammonium groups, hydrazinium groups and ternary sulphonium groups.

Any alkyl, alkylene or alkenylene present may be linear or branched unless indicated otherwise. The alkyl group of any alkoxy group is linear or branched unless indicated to the contrary.

In any hydroxy substituted alkyl, alkylene or alkenylene group which is attached to a nitrogen atom the hydroxy group is bound to a carbon atom other than to the $C_1$-atom.

Any aliphatic amino group as Z is preferably a mono-$C_{1-4}$-alkyl- or a di-($C_{1-4}$alkyl)-amino grpoup. The alkyl group may be monosubstituted by halogen, hydroxy, cyano, $C_{1-4}$alkoxy or phenyl. Any cycloaliphatic amino group is preferably $C_{5-6}$cycloalkylamino, the cycloalkyl group of which may be substituted by one or two $C_{1-2}$alkyl groups.

Any aromatic amino group is preferably phenylamino, the phenyl ring of which is unsubstituted or substituted by one or two groups selected from halogen, $C_{1-4}$alkyl, $C_{1-4}$alkoxy, hydroxy and phenoxy.

Any heterocyclic amino group as Z in which the N-atom or a carbon atom is attached to $W_2$ is preferably a saturated, unsaturated or partially unsaturated 5- or 6-membered ring which contains one or two hetero atoms and may be further substituted by one or two $C_{1-4}$alkyl groups.

1:1 and 1:2 metal complexes of compounds of formula I according to invention, preferably in the 1:1 metal complex form, correspond to formula II or III

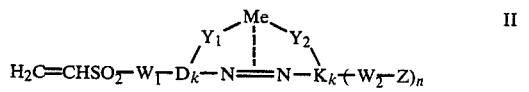

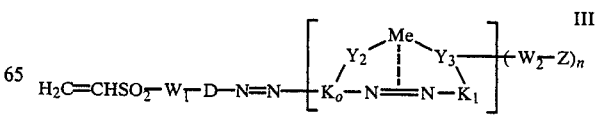

in which $W_1$, $W_2$, D, Z and n are as defined above,

Me is copper, chromium, cobalt, nickel or iron for 1:1 metal complexes (Me is preferably copper in this case) or Me is chromium or cobalt for 1:2 metal complexes, $Y_1$ is —O— or —COO—, each of $Y_2$ and $Y_3$, independently, is —O—, —NH— or —N<, $D_k$ is the radical of a diazo component like D, $K_k$ is the radical of a coupling component like K and $K_1$ is the radical of a coupling component of the benzene or naphthalene series, where each of $D_k$, $K_k$ and $K_1$ is a group containing in an ortho position to the carbon atom attached to the azo group either hydrogen or a metallisable group resulting in $Y_1$ (—O— or —COO—) and $Y_2/Y_3$ (—O—, —NH— or —N<), respectively, $K_o$ is the radical of a coupling/diazo component of the benzene, naphthalene or tetrahydronaphthalene series containing in an ortho position to the carbon atom attached to the group —N=N—$K_1$ either hydrogen or a metallisable group resulting in $Y_2$, the n groups —$W_2$—Z are bound to $K_o$ and/or to $K_1$.

Preferred compounds or complexes according to the invention correspond in metal-free form to formula Ia,

    Ia in which

Da is a group (a) or (b),

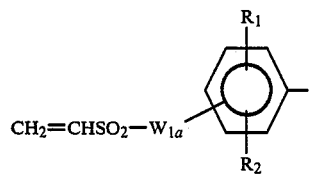

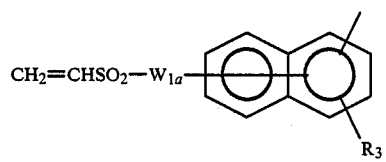

in which each of $R_1$ and $R_2$, independently, is hydrogen, halogen, hydroxy, cyano, nitro, trifluoromethyl, carboxy, $C_{1-4}$alkyl, $C_{1-4}$alkoxy, phenoxy, the phenyl ring of which is unsubstituted or substituted by up to three halogen atoms; sulphonamido, —SO$_2$NHC$_{1-4}$alkyl, —SO$_2$N(C$_{1-4}$alkyl)$_2$, —SO$_2$C$_{1-4}$alkyl, —NHCOC$_{1-4}$alkyl, benzamido or phenylamino, $R_3$ is hydrogen, halogen, hydroxy, amino, $C_{1-4}$alkyl, $C_{1-4}$alkoxy, phenoxy, phenylamino, —NHC$_{1-4}$alkyl, —N(C$_{1-4}$alkyl)$_2$, —NHCOC$_{1-4}$alkyl or benzamido, $W_{1a}$ is a direct bond, a $C_{1-6}$alkylene or $C_{2-6}$alkenylene group which groups are unsubstituted or monosubstituted by halogen, hydroxy, $C_{1-4}$alkoxy or phenyl, and in which the —C—C— chains may be interrupted by an N, O or S atom; —NH—$X_a$ —CONH—$X_a$—; —NHCO—$X_a$—; —CO—$X_a$—; —SO$_2$NH—$X_a$—; —NHNHCO—$X_a$—; —CH$_2$CONHCH$_2$— or —CH$_2$NHCOCH$_2$—, $X_a$ is $C_{1-4}$alkylene or $C_{2-4}$alkenylene, provided that $W_{1a}$ is attached to the SO$_2$-group by a carbon atom of $X_a$, Ka is a group K containing at least one group —$W_2$—Z which corresponds to a group (c) to (i):

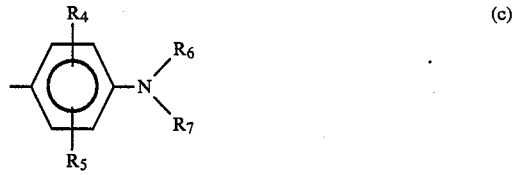

in which $R_4$ is hydrogen, halogen, hydroxy, $C_{1-4}$alkyl, $C_{1-4}$alkoxy, —NHCOC$_{1-4}$alkyl, —NHCONH$_2$, —SO$_2$NH$_2$, —SO$_2$NHC$_{1-4}$alkyl, —SO$_2$N(C$_{1-4}$alkyl)$_2$, —NHCO(CH$_2$)$_{1-4}$—$Z_1$ or —SO$_2$N[(CH$_2$)$_{1-4}$—$Z_1$]$_2$, $R_5$ is hydrogen, $C_{1-4}$alkyl, $C_{1-4}$alkoxy, halogen or hydroxy, $R_6$ is hydrogen, unsubstituted $C_{1-6}$alkyl, $C_{1-6}$alkyl substituted by one or two hydroxy groups or by a phenyl group, halogen or cyano; —(CH$_2$)$_{1-4}$—NHCO(CH$_2$)$_{1-4}$—$Z_1$ or $C_{1-6}$alkylene-$Z_1$, in which the alkylene group may be substituted by one or two hydroxy groups, $R_7$ is hydrogen, unsubstituted $C_{1-6}$alkyl, $C_{1-6}$alkyl substituted by one or two hydroxy groups or by a phenyl group, halogen or cyano; —COCH$_2$—$Z_1$, $C_{1-8}$alkylene—$Z_1$ in which the alkylene group may be substituted by one or two hydroxy groups and in which the alkylene chain may be interrupted by atom groups, such as —NH—, —NCH$_3$, —S—, —O—, —NHCO or —OCO—; or

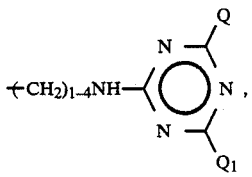

each $Z_1$, independently, Q and $Q_1$ are as defined below;

(d) is a group of formulae (d$_1$) to (d$_5$), where (d$_1$) to (d$_3$) are naphthol groups of the formulae

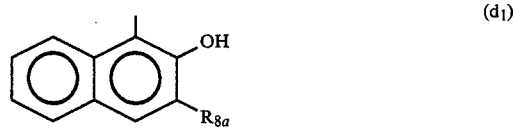

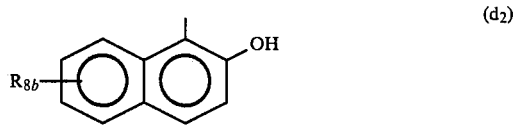

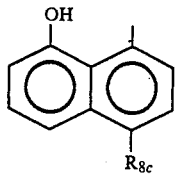

in which $R_{8a}$ is

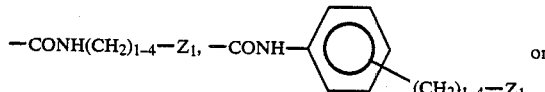

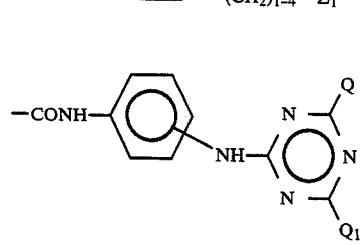

$R_{8b}$ is —NHCO(CH$_2$)$_{1-4}$—Z$_1$, —SO$_2$NH(CH$_2$)$_{1-4}$—Z$_1$ or

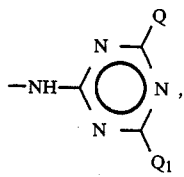

$R_{8c}$ is —NHCO(CH$_2$)$_{1-4}$—Z$_1$, —NH(CH$_2$)$_{1-4}$—Z$_1$ or

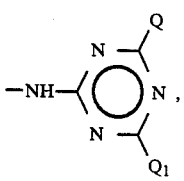

and Q, Q$_1$ and Z$_1$ are as defined below;

(d$_4$) is an aminonaphthyl group of the formulae (d$_4'$)
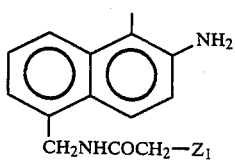

(d$_3$)

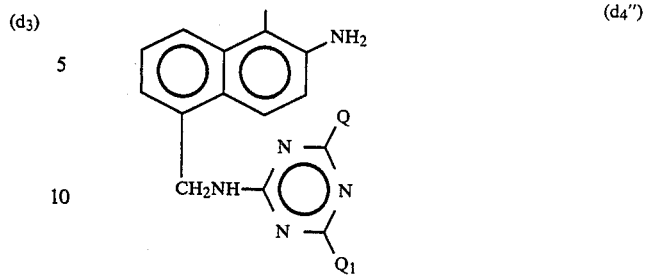

(d$_4''$)

in which Z$_1$, Q and Q$_1$ are as defined below;
and (d$_5$) is a naphthyl group of the formula

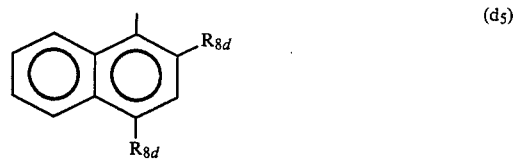

(d$_5$)

in which one of the $R_{8d}$"s is hydrogen and the other is —CONH(CH$_2$)$_{1-4}$—Z$_1$, —NHCO(CH$_2$)$_{1-4}$—Z$_1$, —SO$_2$NH(CH$_2$)$_{1-4}$—Z$_1$, —NH(CH$_2$)$_{1-4}$—Z$_1$ or

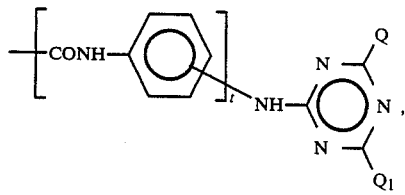

t is 0 or 1 and
Q, Q$_1$ and Z$_1$ are as defined below;
(e) is a group of the formula

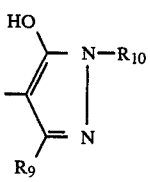

(e)

in which
R$_9$ is C$_{1-4}$alkyl, —COOH or —COOC$_{1-4}$alkyl,
R$_{10}$ is

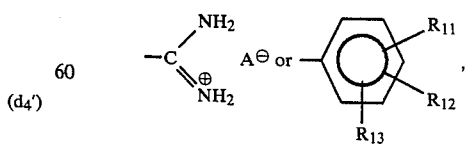

each of R$_{11}$ and R$_{12}$, independently, is hydrogen, halogen, nitro, amino, cyano, hydroxy, C$_{1-4}$alkyl or C$_{1-4}$alkoxy,
R$_{13}$ is

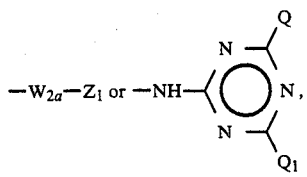

$W_{2a}$ has one of the significances of $W_{1a}$ defined above except a direct bond, where $Z_1$ is attached to a carbon atom of $X_a$, and
$Z_1$, Q, $Q_1$ and $A^\ominus$ are as defined below;
(f) is a group of the formula

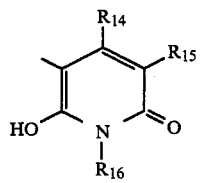

(f)

in which
$R_{14}$ is hydrogen, $C_{1-4}$alkyl, phenyl, benzyl or cyclohexyl,
$R_{15}$ is hydrogen, cyano

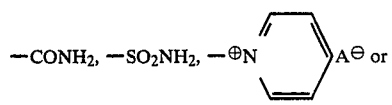

$R_{16}$ is hydrogen,

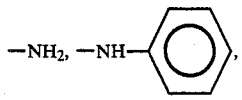

$C_{1-4}$alkyl unsubstituted or monosubstituted by OH, CN, halogen or $C_{1-4}$alkoxy; $C_{1-6}$alkylene—$Z_1$,

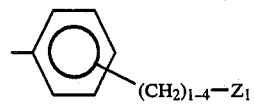

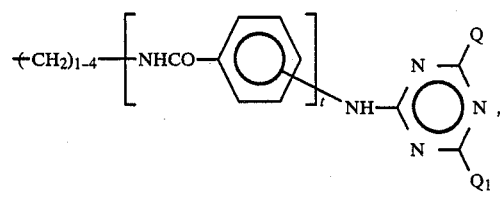

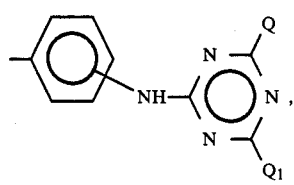

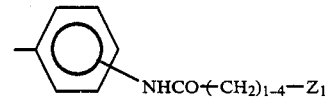

t is 0 or 1, and
Q, $Q_1$, $Z_1$ and $A^\ominus$ are as defined below;
(g) is a group of the formula $$\underset{-CH-CONH-R_{17}}{\overset{COCH_3}{|}} \qquad (g)$$

in which
$R_{17}$ is $C_{1-6}$alkylene—$Z_1$ or

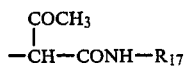

$R_{11}$, $R_{12}$ and $R_{13}$ are as defined above and
$Z_1$ is as defined below;
(h) is a group of the formula

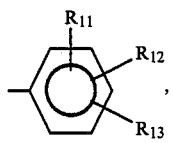

(h)

in which
$R_{14}$ is as defined above,
$R_{18}$ is hydrogen, cyano or —CONH$_2$,
each $R_{19}$, independently, is hydrogen, a $C_{1-4}$alkyl group which is unsubstituted or monosubstituted by hydroxy or $C_{1-4}$alkoxy; or $C_{1-6}$alkylene—$Z_1$,
and $Z_1$ is as defined below;
$A^\ominus$ is an equivalent of a non-chromophoric anion;
Q is a group —NH(CH$_2$)$_{1-6}$—$Z_1$,
$Q_1$ is halogen, hydroxy, amino, $C_{1-4}$alkoxy, phenoxy, phenylamino, cyclohexylamino, $C_{1-4}$alkylamino, di($C_{1-4}$alkyl)amino or Q;
$Z_1$ is a protonatable amino group —NR$_{20}$R$_{21}$ or a quaternay ammonium group —N$^\oplus$R$_{22}$R$_{23}$R$_{24}$ $A^\ominus$,
or $Z_1$ forms a protonatable or quaternary 5- or 6-membered saturated heterocyclic ring of the formula

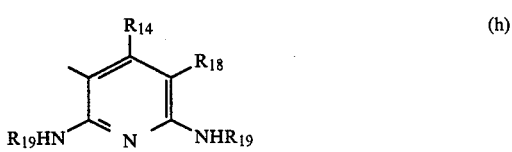

or a corresponding protonatable or quaternary 5- or 6-membered unsaturated or partially unsaturated heterocyclic ring,
each of $R_{20}$ and $R_{21}$, independently, is hydrogen, $C_{1-4}$alkyl, $C_{2-4}$alkyl monosubstituted by hydroxy, $C_{1-4}$alkoxy, halogen or cyano; phenyl-$C_{1-4}$alkyl, the phenyl group of which is unsubstituted or substituted by one to three groups selected from chlorine, $C_{1-4}$alkyl and $C_{1-4}$alkoxy, or $C_{5-6}$cycloalkyl,
or

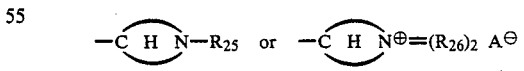

$R_{20}$ and $R_{21}$, together with the N-atom to which they are attached, form a heterocyclic ring of the formula

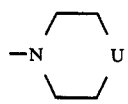

in which
U is the direct bond, $-CH_2-$, $-O-$, $-S-$, $-SO_2-$, $-SO-$, $-NH-$, $-N(C_{1-4}alkyl)-$ or $-N^{\oplus}(C_{1-4}alkyl)_2- A^{\ominus}$,
each of $R_{22}$ and $R_{23}$ has independently one of the cyclic or non-cyclic significances of $R_{20}$ and $R_{21}$ except hydrogen, and
$R_{24}$ is $C_{1-4}$alkyl or phenyl-$C_{1-4}$alkyl, or
$R_{22}$, $R_{23}$ and $R_{24}$, together with the N-atom to which they are attached, form a pyridinium group unsubstituted or substituted by one or two methyl groups, or a ring of the formula

in which $R_{24}$, U and $A^{\ominus}$ are as defined above,
$R_{25}$ is hydrogen or $C_{1-4}$alkyl and
each $R_{26}$, independently, is $C_{1-4}$alkyl;
(i) is a group of formulae ($i_1$) to ($i_4$)

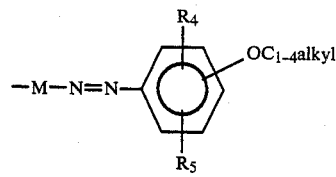 ($i_1$)

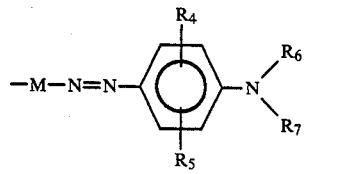 ($i_2$)

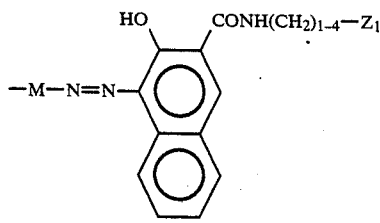 ($i_3$)

or

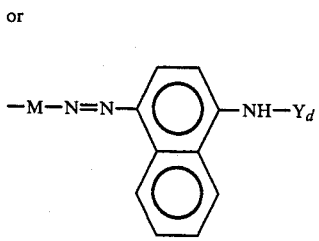 ($i_4$)

in which $Y_d$ is $-(CH_2)_{1-4}-Z_1$,

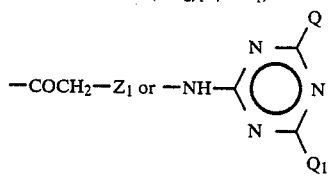

in which
M is

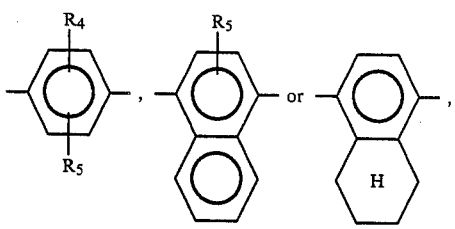

each of $R_4$ and $R_5$, independently, is as defined above and $R_6$, $R_7$, Q, $Q_1$ and $Z_1$ are as defined above.

More preferred are compounds or complexes according to the invention containing one or two protonatable amino groups or quaternary ammonium groups as defined above which correspond in metal-free form to formula Ib or Ic

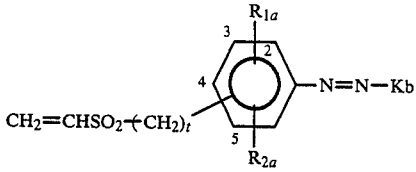 Ib

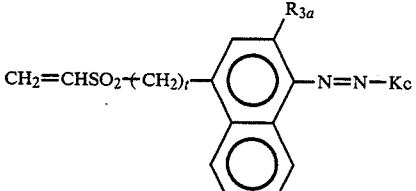 Ic in which
t is 0 or 1,
$R_{3a}$ is hydrogen or hydroxy,
Kc is a group of the formula

or

-continued

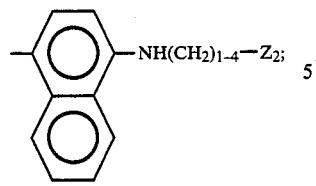

$R_{1a}$ is hydrogen, halogen, $C_{1-2}$alkyl, $C_{1-2}$alkoxy, —OH, —COOH, —CN, phenoxy, the phenyl group of which may be substituted by one to three chlorine atoms, —SO$_2$NH$_2$, —SO$_2$NHC$_{1-2}$alkyl, —SO$_2$N(C$_{1-2}$alkyl)$_2$, —NHCOCH$_3$ or phenylamino, $R_{2a}$ is hydrogen, halogen, $C_{1-2}$alkyl or $C_{1-2}$alkoxy;

$K_b$ is a group (c$_1$); (d$_{1a}$), (d$_{2a}$), (d$_{3a}$), (d$_{5a}$); (e$_1$), (f$_1$), (g$_1$), (i$_{2a}$), (i$_{3a}$) or (i$_{4a}$),

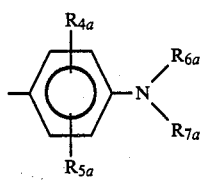

in which
  $R_{4a}$ is hydrogen, chlorine, $C_{1-2}$alkyl, $C_{1-2}$alkoxy, —NHCOC$_{1-2}$alkyl, —NHCONH$_2$ or —NHCO(CH$_2$)$_{1-4}$—Z$_2$,
  $R_{5a}$ is hydrogen, chlorine, $C_{1-2}$alkyl or $C_{1-2}$alkoxy,
  $R_{6a}$ is hydrogen, $C_{1-2}$alkyl, benzyl, —C$_2$H$_4$OH, —C$_2$H$_4$CN, —C$_2$H$_4$Cl, C$_{1-4}$alkylene—Z$_2$, —CH$_2$CH(OH)CH$_2$—Z$_2$ or —(CH$_2$)$_{2-3}$—NHCOCH$_2$—Z$_2$,
  $R_{7a}$ is hydrogen, $C_{1-2}$alkyl, benzyl, C$_2$H$_4$OH, C$_2$H$_4$Cl, C$_2$H$_4$CN, C$_{1-4}$alkylene—Z$_2$, —CH$_2$CH(OH)CH$_2$—Z$_2$, —(CH$_2$)$_{2-3}$—OCH$_2$CH(OH)CH$_2$—Z$_2$, —(CH$_2$)$_{2-3}$—NHCOCH$_2$—Z$_2$, —COCH$_2$—Z, —(CH$_2$)$_{2-3}$—[4-pyridyl]   —(CH$_2$)$_{2-3}$—[2-pyridyl], —(CH$_2$)$_{2-3}$—[4-(N$^\oplus$—CH$_3$)pyridyl] A$^\ominus$ or —(CH$_2$)$_{2-3}$—[2-(N$^\oplus$—CH$_3$)pyridyl] A$^\ominus$;

(d$_{1a}$)

naphthol with $R_{8a'}$

-continued (d$_{2a}$)

naphthol with $R_{8b'}$ (d$_{3a}$)

naphthol with $R_{8c'}$ (d$_{5a}$)

naphthalene with $R_{8d'}$ substituents in which
  $R_{8a'}$ is

—CONH(CH$_2$)$_{1-4}$—Z$_2$ or

—CONH—[phenyl]—NH—[triazine with Q$_a$, Q$_{1a}$], $R_{8b'}$ is

—NHCO(CH$_2$)$_{1-4}$—Z$_2$, —SO$_2$NH(CH$_2$)$_{2-3}$—Z$_2$ or

—NH—[triazine with Q$_a$, Q$_{1a}$], $R_{8c'}$ is

—NHCO—(CH$_2$)$_{1-3}$—Z$_2$, —NH(CH$_2$)$_{2-3}$—Z$_2$,

—NH—[triazine with Q$_a$, Q$_{1a}$] or —NH—(CH$_2$)$_{2-3}$—[2-pyridyl], one of the groups $R_{8d'}$ is hydrogen and the other is

—CONH(CH$_2$)$_{1-4}$—Z$_2$, —NHCO(CH$_2$)$_{1-4}$—Z$_2$,

-continued

—NH(CH₂)₁₋₄—Z₂ or 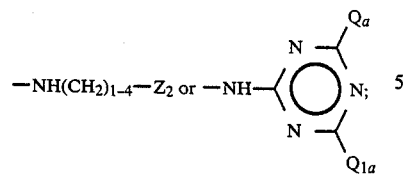

(e₁)

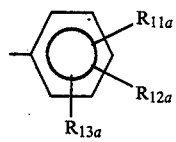

in which
R₁₀ₐ is

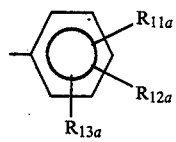

each of R₁₁ₐ and R₁₂ₐ, independently, is hydrogen, chlorine, methyl or methoxy,
R₁₃ₐ is —NHCOCH₂—Z₂, —CONH(CH₂)₂₋₃—Z₂ or 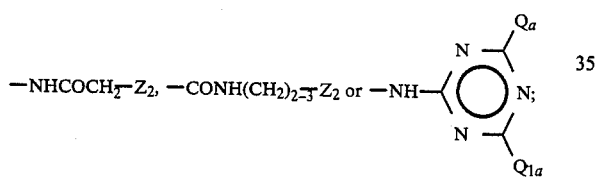

(f₁)

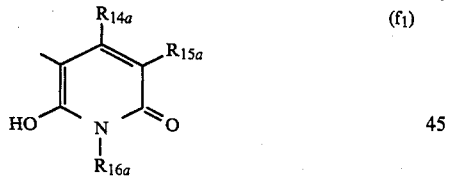

in which
R₁₄ₐ is hydrogen, methyl, ethyl or benzyl,
R₁₅ₐ is hydrogen, —CONH₂ or —CH₂NHCOCH₂—Z₂,
R₁₆ₐ is hydrogen, C₁₋₂alkyl,

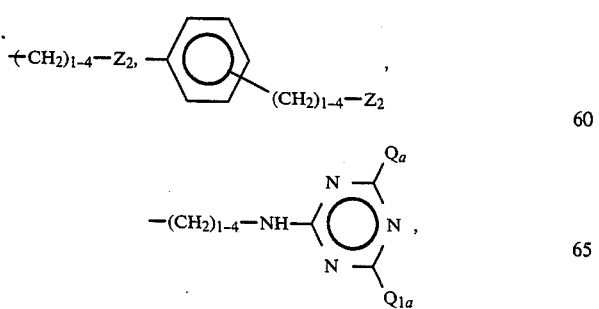

-continued

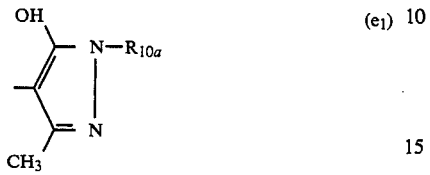

—(CH₂)₁₋₄—NHCO(CH₂)₁₋₄—Z₂ or

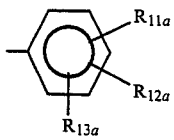

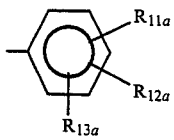

(g₁)

in which
R₁₇ₐ is

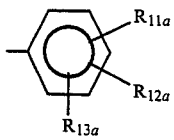

and R₁₁ₐ, R₁₂ₐ and R₁₃ₐ are as defined above;

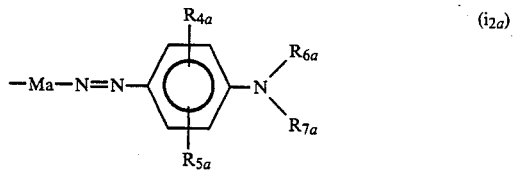 (i₂ₐ)

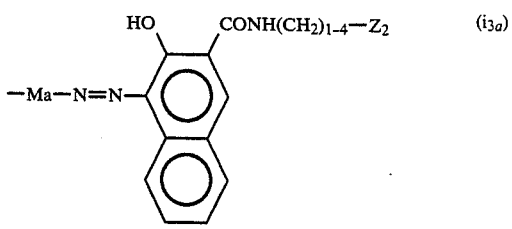 (i₃ₐ)

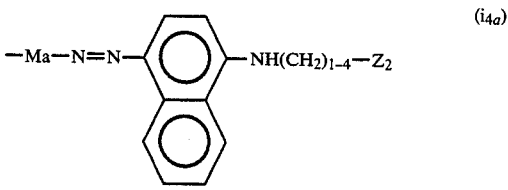 (i₄ₐ)

in which Ma is

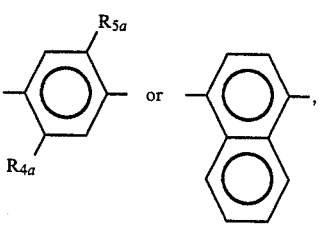

$R_{4a}$, $R_{5a}$, $R_{6a}$ and $R_{7a}$ are as defined above and $Z_2$ is as defined below;

$Q_a$ is a group $-NH(CH_2)_{1-4}-Z_2$ and $Q_{1a}$ is chlorine, $-OH$, $-NH_2$, $C_{1-2}$alkoxy, phenoxy, phenylamino or $Q_a$;

$Z_2$ is a group $-NR_{20a}R_{21a}$ or $-N^{\oplus}R_{22a}R_{23a}R_{24a}$ $A^{\ominus}$, $A^{\ominus}$ is an equivalent of a non-chromophoric anion, each of $R_{20a}$ and $R_{21a}$, independently, is hydrogen, $C_{1-2}$alkyl, unbranched hydroxy-$C_{2-3}$alkyl or benzyl or both $R_{20a}$ and $R_{21a}$, together with the N-atom to which they are attached, form a pyrrolidine, piperidine, morpholine, piperazine or N-methylpiperazine group, each of $R_{22a}$ and $R_{23a}$ has independently one of the non-cyclic or cyclic significances of $R_{20a}$ and $R_{21a}$ except hydrogen, and $R_{24a}$ is methyl, ethyl or benzyl, or $R_{22a}$, $R_{23a}$ and $R_{24a}$, together with the N-atom to which they are attached, for a pyridinium group unsubstituted or substituted by one or two methyl groups.

In a compound of formula Ib the positions for $R_{1a}$, $R_{2a}$ and the group $-(CH_2)_t-SO_2-CH=CH_2$ ($=R$) preferably are as follows:

(i) $R_{1a}=R_{2a}=H$:
  R can be in any of positions 2 to 6 of the phenyl group; more preferably, it is in the 3- or 4-position;

(ii) one of $R_{1a}$ and $R_{2a}\neq H$, the other $=H$:
  $R_{1a}$ ($R_{2a}$) is in the 2-position, R is in the 4- or 5-position;

(iii) $R_{1a}$ and $R_{2a}\neq H$:
  $R_{1a}$ and $R_{2a}$ are in the 2- and 6-positions,
  R is in the 4-position.

Most preferred are compounds or complexes according to the invention which, in metal-free form, correspond to formula Id,

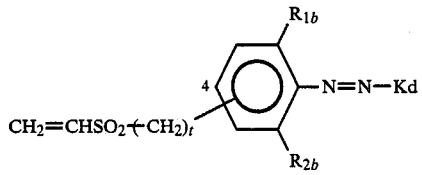

in which
t is 0 or 1, $R_{1b}$ is hydrogen, chlorine, bromine, cyano, methyl or $C_{1-2}$alkoxy, $R_{2b}$ is hydrogen, chlorine or bromine;

Kd is a group (c$_2$), (d$_{1b}$), (d$_{2b}$), (d$_{3b}$) or (f$_2$),

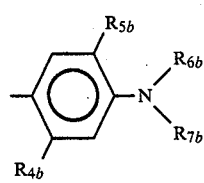

in which $R_{4b}$ is hydrogen, methyl, $-NHCOCH_3$ or $-NHCOCH_2-Z_3$, $R_{5b}$ is hydrogen or $C_{1-2}$alkoxy, $R_{6b}$ is hydrogen, $C_{1-2}$alkyl, $-C_2H_4OH$, $-C_2H_4CN$, $-(CH_2)_{2-3}-Z_3$, $-CH_2CH(OH)CH_2-Z_3$ or $-C_2H_4NHCOCH_2-Z_3$, $R_{7b}$ is

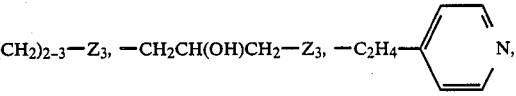

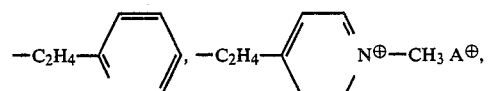

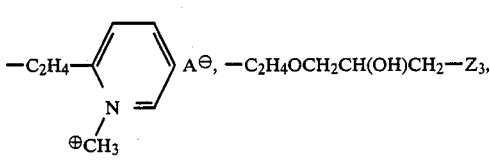

$-C_2H_4NHCOCH_2-Z_2$ or $-COCH_2-Z_2$;

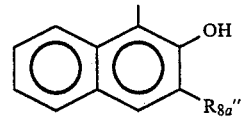

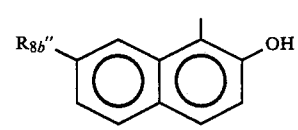

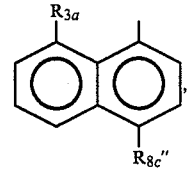

in which $R_{3a}$ is hydrogen or hydroxy, $R_{8a}''$ is $-CONH(CH_2)_{2-3}-Z_3$ or

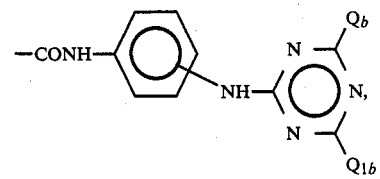

$R_{8b}''$ is

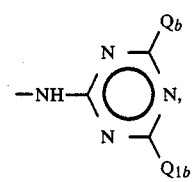

$R_{8c}''$ is $-NH(CH_2)_{2-3}-Z_3$, $-NHCOCH_2-Z_3$ or

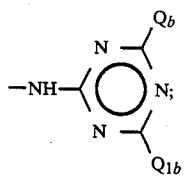

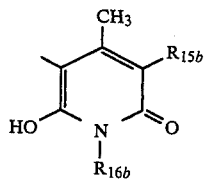

(f₂)

in which

R$_{15b}$ is hydrogen, —CONH$_2$ or —CH$_2$NHCOCH$_2$—Z$_3$,

R$_{16b}$ is hydrogen, —(CH$_2$)$_{2-3}$—Z$_3$ or

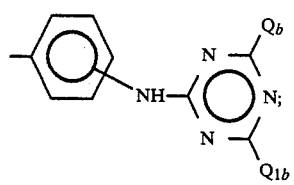

A$^\ominus$ is an equivalent of a non-chromophoric anion, each Q$_b$ and Q$_{1b}$, independently, is a group —NH(CH$_2$)$_{2-3}$—Z$_3$, Z$_3$ is a group —NR$_{20b}$R$_{21b}$ or —N$^\oplus$R$_{22b}$R$_{23b}$R$_{24b}$A$^\ominus$, each of R$_{20b}$ and R$_{21b}$ is methyl or ethyl or both R$_{20b}$ and R$_{21b}$, together with the N-atom to which they are attached, form a piperdine, morpholine, piperazine or N-methylpiperazine ring; each of R$_{22b}$ and R$_{23b}$ is methyl or ethyl or both R$_{22b}$ and R$_{23b}$, together with the N-atom to which they are attached, has one of the cyclic significances of R$_{20b}$ and R$_{21b}$, R$_{24b}$ is methyl or ethyl or R$_{22b}$, R$_{23b}$ and R$_{24b}$, together with the N-atom to which they are attached, form a pyridinium group unsubstituted or substituted by one or two methyl groups.

In a compound of formula Id the group —(CH$_2$)$_t$13 SO$_2$CH=CH$_2$ is preferably
 (i) in the 3- or 4-positon when R$_{1b}$=R$_{2b}$=hydrogen;
 (ii) in the 4- or 5-position when one of R$_{1b}$ and R$_{2b}$ is hydrogen and the other is other than hydrogen;
 (iii) in the 4-position when R$_{1b}$ and R$_{2b}$ are both other than hydrogen;
more preferably t is 0.

In the compounds of formula I the anions A$^\ominus$ can be any non-chromophoric anions such as those conventional in basic dyestuff chemistry. Suitable anions include chloride, bromide, sulphate, bisulphate, methylsulphate, aminosulphonate, perchlorate, benzenesulphonate, oxalate, maleate, acetate, propionate, lactate, succinate, tartrate, malate, methanesulphonate and benzoate as well as complex anions, for example zinc chloride double salts and anions of boric acid, citric acid, glycolic acid, diglycolic acid and adipic acid or addition products of ortho boric acids with polyalcohols with at least one cis diol group present. These anions can be exchanged for each other by ion exchange resins or on reaction with acids or salts (for example via the hydroxide or bicarbonate) or according to the method given in German Offenlegungsschrift Nos. 20 01 748 or 20 01 816.

Compounds of formula I can be prepared by reacting a diazotised compound of formula IV

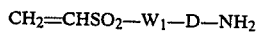    IV with a compound of formula V

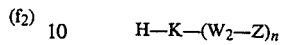    V and optionally converting the obtained metal-free compound of formula I into the corresponding 1:1 or 1:2 metal complex.

Diazotisation and coupling reactions may be effected in conventional manner. The conditions of any coupling reaction e.g., temperature and pH, depend on each particular coupling component used in the preparation process.

A compound of formula I can also be prepared by splitting off a compound H-B from a compound of formula VI,

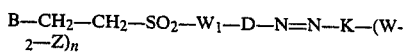    VI in which B is a group which under the reaction conditions is split off, such as —OSO$_3$H, —OPO$_3$H$_2$, halogen, —OCOCH$_3$, —SSO$_3$H, amino, lower alkyl substituted amino or a lower alkyl substituted quaternary ammonium group.

This reaction is carried out in accordance with known methods. Advantageously, splitting off is effected in an aqueous alkaline medium in the presence of a basic compound such as sodium hydroxide, where the pH is in the range of 6 to 13, especially 10 to 11.

The starting compounds of formulae IV, V and VI are either known or may be prepared in accordance with known methods from available starting materials.

Compounds of formula I containing metallisable groups in an ortho position to the carbon atom attached to the azo group may be converted into metal complexes by reacting the metal-free compound of formula I with a metal-donating compound which is employed in such an amount to provide at least one equivalent of metal per equivalent of monoazo compound to be metallised.

Metallisation is carried out in accordance with known methods.

For example, metal complexes of formula II or III can be prepared by reacting a compound of formula IIa or IIIa

    IIa

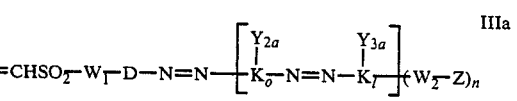    IIIa in which

Y$_{1a}$ is H, OH, C$_{1-4}$alkoxy or COOH,

Y$_{2a}$ is OH, NH$_2$ or substituted amino,

Y$_{3a}$ is H, OH, NH$_2$, substituted amino or C$_{1-4}$alkoxy, and each of Y$_{1a}$, Y$_{2a}$ and Y$_{3a}$ is in an ortho position to the azo group, with a metal-donating compound in such an amount to provide at least one equivalent of metal per equivalent of monoazo compound to be metallised to obtain a 1:1 or 1:2 metal complex.

Preferred is the 1:1 metallisation and more preferred the preparation of 1:1 copper complexes. Suitably, the preferred 1:1 copper complexes are prepared either by oxidative coppering, preferably at 40°–70° C. and at pH 4–7 in the presence of copper(II) salts or using copper powder in the presence of hydrogen peroxide or other conventional oxidising agents; or preferably by demethylation coppering, preferably at pH 3–4 and at elevated to boiling temperature in the presence of copper(II) salts.

The compounds of formula I in metal-free form or in 1:1 or 1:2 metal complex form may be isolated in accordance with known methods.

Those compounds of formula I containing basic groups may be converted into water-soluble salts by reacting with at least stoichiometric amounts of an inorganic mineral acid such as hydrochloric acid, sulphuric acid, phosphoric acid or preferably an organic acid such as formic acid, acetic acid, lactic acid, citric acid, glycolic acid or methanesulphonic acid.

The metal-free compounds of formula I and 1:1 and B 1:2 metal complexes thereof in their acid addition salt form or as quaternary ammonium salt (hereinafter referred to as the dyes of formula I) are useful as dyestuffs for dyeing and printing fibres, threads or textile materials particularly natural or synthetic polyamide materals, for example wool, silk, nylon etc. which preferably can be dyed by exhaustion using a long or short liquor at room to boiling temperature.

Printing can be carried out by impregnation with a printing paste which can be prepared by known methods.

Furthermore, the dyes of formula I can be used for dyeing or printing cotton, polyacrylonitrile or fibre blends, such as cotton-polyester, polyester-wool or polyacrylonitrile-wool fibre blends. The dyes of formula I are also well suited for dyeing or printing leather including low affinity vegetable-tanned leather, in accordance with known methods.

The resulting dyeings and prints on the different substrates show good fastness properties.

The dyes of formula I have good solubility properties in particular good cold water solubility. They build-up well, migrate well and have notable equalising properties particularly on wool or synthetic polyamide substrate even without using any levelling agent; they give high exhaust and fixation yields. The portion of unfixed dyestuff can be easily washed off the substrate. The resulting dyeings and prints are brilliant and show notably good light fastness properties; on exposure to light for a long time the shade of the dyeing fades tone in tone. Furthermore, the dyeings made with the dyestuffs according to the invention have good wet fastness properties. Any aftertreatment with ammonia usually carried out for fibre-reactive dyeings on wool to improve the wet fastnesses is unnecessary. The dyeing process therefore is gentle on the wool-fibres.

The dyes of formula I are also well suited for dyeing in combination. The thus obtained dyeings have good fastness properties.

The following Examples further serve to illustrate the invention. In the Examples all parts and percentages are by weight or volume and the temperatures given are in degrees centigrade unless indicated to the contrary.

EXAMPLE 1

21.8 Parts of 1-amino-2-chloro-4-vinylsulphonylbenzene are dissolved in 500 parts of glacial acetic acid at 70°. To this solution 38 parts of 30% hydrochloric acid and then a solution of 6.9 parts of sodium nitrite in 25 parts of water are added whilst cooling with ice. After one hour any excess nitrous acid is decomposed by the addition of 0.5 parts of sulphamic acid. The resulting suspension is added dropwise to a solution consisting of 27.6 parts of the coupling component of the formula

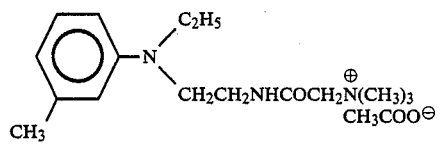

in 1200 parts of water within one hour. The pH of the coupling mixture is kept at 3.0 to 3.5 by the addition of sodium acetate. After three hours the dark-red solution is adjusted to a volume of 2.5 liters. The thus obtained dyeing solution containing the dye-stuff of the formula

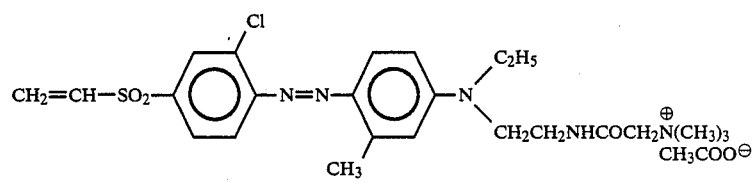

dyes wool a red shade. This dyestuff has notably good levelling properties. The resulting wool dyeings have good light and wet fastness properties.

EXAMPLE 2

31.6 Parts of 1-amino-2-chloro-4-(2'-sulphatoethyl)-sulphonylbenzene (which is prepared in accordance with known methods) are dissolved in 800 parts of water and 35 parts of a 30% hydrochloric acid solution and are diazotised at 0° to 5° by the addition of 6.9 parts of sodium nitrite in 25 parts of water. After one hour any excess nitrous acid is decomposed by the addition of 0.5 parts of sulphamic acid. The clear solution of the diazonium salt is added to a solution containing 27.6 parts of the coupling component of the formula

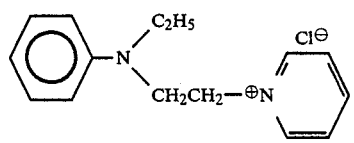

in 1000 parts of water. The pH of the coupling mixture is kept at 3.0 to 3.5 by the addition of solid sodium acetate. After three hours the dark-orange solution containing the dyestuff corresponding to the formula

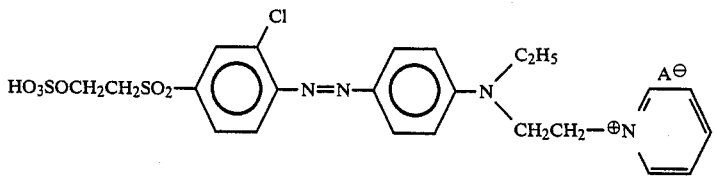

in which $A^\ominus$ is the anion of the reaction medium, is adjusted to a volume of 2.5 liters by the addition of water. Adjusting the pH of this solution at 10 to 11 by the addition of sodium hydroxide solutin the dyestuff corresponding to the formula

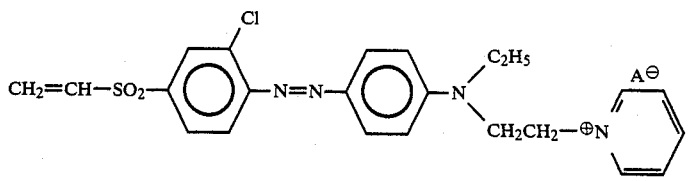

in which $A^\ominus$ is as defined above, is obtained which dyes wool as well as silk a billiant orange shade. These dyeings show good fastness properties.

In the intermediate monoazo compound of Example 2 any further group to be split off can be used instead of the group —$OSO_3H$, for example, a chlorine, bromine, tosyl or ammonium group.

EXAMPLE 3

When using an equimolar amount of the diazonium salt of 1-amino-2-methyl-4-vinylsulphonylbenzene (prepared in accordance with the method given in Example 1) which is coupled with a solution of 26 parts of the coupling component of the formula

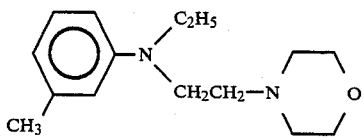

dissolved in 500 parts of water and 100 parts of glacial acetic acid an orange mixture is obtained. After a short time the dyestuff precipitates and is filtered from the suspension and dried. The dyestuff having the formula

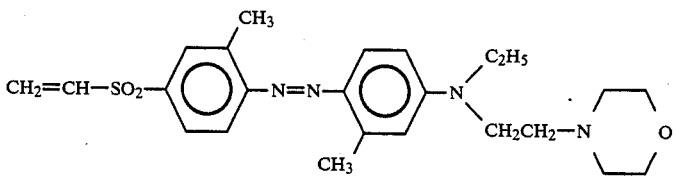

is obtained in form of the acid addition salt with acetic acid which dyes polyester as well as polyester/cotton fibre blends or synthetic polyamides a scarlet shade. The dyeings have good fastness properties.

EXAMPLE 4 TO 77

Further compounds according to the invention and corresponding to formula (1)

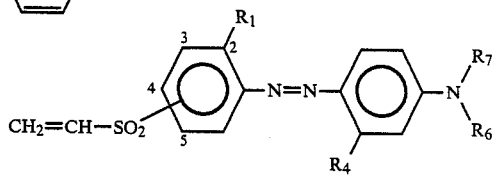

(1)

in which the symbols are defined in Table 1 below can be prepared by a method analogous to that of Examples 1 to 3 from appropriate starting compounds.

In the last column of this Table 1 and also of all the following Tables 2 to 9 the shade of the dyeings on natural or synthetic polyamide fibres is given whereby
a is a greenish-yellow
b is yellow
c is golden-yellow
d is orange
e is scarlet
f is red
g is bordeaux
h is ruby
i is blue
j is reddish-blue
k is reddish-brown
l is violet
m is brown
n is olive
o is grey.

Generally, in the Tables any $A^\ominus$ is the anion of the reaction medium or is one of the anions indicated in the description above. Likewise, any basic groups may be in free base form or in form of the acid addition salt with those acids of the medium used in the preparation process.

TABLE 1 compounds of formula (1)

| Ex. No. | $R_1$ | position of $-SO_2CH=CH_2$ | $R_4$ | $R_6$ | $R_7$ | shade on PA |
|---|---|---|---|---|---|---|
| 4 | H | 4 | H | $C_2H_5$ | $-C_2H_4-\overset{\oplus}{N}(CH_3)(morpholine)$ $A^\ominus$ | d |
| 5 | $CH_3$ | 5 | $CH_3$ | $C_2H_5$ | $-C_2H_4-\overset{\oplus}{N}(CH_3)(morpholine)$ $A^\ominus$ | e |
| 6 | CN | 4 | $CH_3$ | $C_2H_5$ | $-C_2H_4-\overset{\oplus}{N}(CH_3)(morpholine)$ $A^\ominus$ | e |
| 7 | Cl | 4 | $CH_3$ | $C_2H_5$ | $-C_2H_4-\overset{\oplus}{N}(CH_3)(morpholine)$ $A^\ominus$ | e |
| 8 | $OCH_3$ | 5 | $CH_3$ | $C_2H_5$ | $-C_2H_4-\overset{\oplus}{N}(CH_3)(morpholine)$ $A^\ominus$ | f |
| 9 | $OCH_3$ | 5 | H | $C_2H_5$ | $-C_2H_4-\overset{\oplus}{N}(CH_3)(morpholine)$ $A^\ominus$ | f |
| 10 | CN | 4 | $CH_3$ | $C_2H_5$ | $-C_2H_4N(CH_3)_2$ | e |
| 11 | Cl | 4 | $CH_3$ | same as $R_7$ | $-C_2H_4N(CH_3)_2$ | d |
| 12 | H | 3 | $CH_3$ | same as $R_7$ | $-C_2H_4N(CH_3)_2$ | c |
| 13 | H | 3 | H | same as $R_7$ | $-C_2H_4N(CH_3)_2$ | c |
| 14 | $OCH_3$ | 5 | H | same as $R_7$ | $-C_2H_4N(CH_3)_2$ | d |
| 15 | H | 3 | H | $C_2H_5$ | $-C_2H_4N(CH_3)_2$ | d |
| 16 | Cl | 4 | $CH_3$ | $C_2H_5$ | $-C_2H_4N(C_2H_5)_2$ | e |
| 17 | Cl | 4 | H | $-C_2H_4CN$ | $-C_2H_4N(C_2H_5)_2$ | d |
| 18 | CN | 5 | $-NHCOCH_3$ | $C_2H_5$ | $-C_2H_4-N(morpholine)O$ | d |
| 19 | H | 3 | H | same as $R_7$ | $-C_2H_4-N(morpholine)O$ | c |
| 20 | Cl | 4 | H | same as $R_7$ | $-C_2H_4-N(morpholine)O$ | d |
| 21 | $OCH_3$ | 5 | $CH_3$ | same as $R_7$ | $-C_2H_4-N(morpholine)O$ | f |
| 22 | $OCH_3$ | 5 | H | same as $R_7$ | $-C_2H_4-N(morpholine)O$ | f |

TABLE 1-continued compounds of formula (1)

| Ex. No. | R₁ | position of —SO₂CH=CH₂ | R₄ | R₆ | R₇ | shade on PA |
|---|---|---|---|---|---|---|
| 23 | Cl | 4 | H | —C₂H₄CN | —C₂H₄—N(morpholine) | d |
| 24 | Br | 4 | H | C₂H₅ | —C₃H₆—N(morpholine) | d |
| 25 | Cl | 4 | CH₃ | C₂H₅ | —C₃H₆—N(morpholine) | f |
| 26 | Cl | 4 | H | same as R₇ | —C₂H₄N(C₂H₅)₃⁺ A⁻ | e |
| 27 | Cl | 5 | CH₃ | CH₃ | —C₂H₄N(C₂H₅)₃⁺ A⁻ | e |
| 28 | Cl | 4 | CH₃ | C₂H₅ | —C₂H₄N(C₂H₅)₃⁺ A⁻ | e |
| 29 | H | 4 | CH₃ | C₂H₅ | —C₂H₄N(C₂H₅)₃⁺ A⁻ | d |
| 30 | H | 4 | H | C₂H₅ | —C₂H₄N(C₂H₅)₃⁺ A⁻ | d |
| 31 | OCH₃ | 4 | —NHCONH₂ | C₂H₅ | —C₂H₄—N⁺(pyridinium) A⁻ | f |
| 32 | OCH₃ | 5 | —NHCOCH₃ | C₂H₅ | —C₂H₄—N⁺(pyridinium) A⁻ | f |
| 33 | H | 4 | H | C₂H₅ | —C₂H₄—N⁺(pyridinium) A⁻ | c |
| 34 | H | 4 | CH₃ | C₂H₅ | —C₂H₄—N⁺(pyridinium) A⁻ | d |
| 35 | H | 3 | CH₃ | C₂H₅ | —C₂H₄—N⁺(pyridinium) A⁻ | c |
| 36 | H | 3 | H | C₂H₅ | —C₂H₄—N⁺(pyridinium) A⁻ | c |
| 37 | Cl | 4 | CH₃ | C₂H₅ | —C₂H₄—N⁺(pyridinium) A⁻ | d |

TABLE 1-continued compounds of formula (1)

| Ex. No. | $R_1$ | position of $-SO_2CH=CH_2$ | $R_4$ | $R_6$ | $R_7$ | shade on PA |
|---|---|---|---|---|---|---|
| 38 | $OCH_3$ | 5 | H | $C_2H_5$ | $-C_2H_4-\overset{\oplus}{N}\langle pyridinium\rangle A^{\ominus}$ | d |
| 39 | $OCH_3$ | 5 | $CH_3$ | $C_2H_5$ | $-C_2H_4-\overset{\oplus}{N}\langle pyridinium\rangle A^{\ominus}$ | d |
| 40 | H | 4 | $CH_3$ | $C_2H_5$ | $-CH_2\underset{OH}{CH}CH_2N(C_2H_5)_2$ | c |
| 41 | H | 3 | $-NHCOCH_3$ | $C_2H_5$ | $-CH_2\underset{OH}{CH}CH_2N(C_2H_5)_2$ | e |
| 42 | Cl | 4 | $CH_3$ | same as $R_7$ | $-CH_2\underset{OH}{CH}CH_2\overset{\oplus}{N}(C_2H_5)_3A^{\ominus}$ | d |
| 43 | H | 4 | $CH_3$ | $C_2H_5$ | $-CH_2\underset{OH}{CH}CH_2-N\langle morpholino\rangle O$ | d |
| 44 | Cl | 4 | $CH_3$ | $C_2H_5$ | $-C_2H_4\overset{\oplus}{N}(CH_3)_2NH_2A^{\ominus}$ | d |
| 45 | Cl | 4 | H | $C_2H_5$ | $-C_2H_4\overset{\oplus}{N}(CH_3)_2NH_2A^{\ominus}$ | d |
| 46 | Cl | 4 | $CH_3$ | $C_2H_5$ | $-C_2H_4OCH_2\underset{OH}{CH}CH_2N(C_2H_5)_2$ | e |
| 47 | Cl | 5 | $CH_3$ | $C_2H_5$ | $-C_2H_4OCH_2\underset{OH}{CH}CH_2N(CH_3)_2$ | e |
| 48 | Cl | 4 | $CH_3$ | $C_2H_5$ | $-C_2H_4NHCOCH_2-N\langle morpholino\rangle O$ | f |
| 49 | Cl | 4 | $CH_3$ | same as $R_7$ | $-C_2H_4NHCOCH_2-N\langle morpholino\rangle O$ | f |
| 50 | H | 4 | $-NHCOCH_3$ | $C_2H_5$ | $-C_2H_4NHCOCH_2-N\langle morpholino\rangle O$ | f |
| 51 | H | 4 | $CH_3$ | $C_2H_5$ | $-C_2H_4NHCOCH_2-N\langle morpholino\rangle O$ | f |
| 52 | H | 4 | H | $C_2H_5$ | $-C_2H_4NHCOCH_2-N\langle morpholino\rangle O$ | f |

TABLE 1-continued compounds of formula (1)

| Ex. No. | $R_1$ | position of $-SO_2CH=CH_2$ | $R_4$ | $R_6$ | $R_7$ | shade on PA |
|---|---|---|---|---|---|---|
| 53 | H | 3 | H | $C_2H_5$ | $-C_2H_4NHCOCH_2-N\bigg\langle\begin{array}{c}\\\\\end{array}\bigg\rangle O$ | e |
| 54 | $OCH_3$ | 5 | $CH_3$ | $C_2H_5$ | $-C_2H_4NHCOCH_2-N\bigg\langle\begin{array}{c}\\\\\end{array}\bigg\rangle O$ | f |
| 55 | $OCH_3$ | 5 | H | $C_2H_5$ | $-C_2H_4NHCOCH_2-N\bigg\langle\begin{array}{c}\\\\\end{array}\bigg\rangle O$ | f |
| 56 | Cl | 4 | $CH_3$ | $C_2H_5$ | $-C_2H_4$-(4-pyridyl) | e |
| 57 | Cl | 4 | $CH_3$ | $C_2H_5$ | $-C_2H_4$-(N-methylpyridinium, $A^\ominus$) | e |
| 58 | Cl | 4 | $CH_3$ | $C_2H_5$ | $-C_2H_4$-(2-pyridyl) | e |
| 59 | Cl | 4 | $-NHCOCH_3$ | H | $-C_2H_4$-(2-pyridyl) | e |
| 60 | Cl | 4 | $CH_3$ | $C_2H_5$ | $-C_2H_4$-(N-methylpyridinium-2-yl, $A^\ominus$) | d |
| 61 | H | 4 | H | $C_2H_5$ | $-C_3H_6N(C_2H_5)_2$ | d |
| 62 | H | 3 | $CH_3$ | $C_2H_5$ | $-C_3H_6N(CH_3)_2$ | d |
| 63 | $CH_3$ | 4 | $CH_3$ | $C_2H_5$ | $-C_3H_6N(CH_3)_2$ | e |
| 64 | Cl | 4 | $-NHCOCH_2N(CH_3)_2$ | $C_2H_5$ | $C_2H_5$ | f |
| 65 | Cl | 4 | $-NHCOC_2H_4N(C_2H_5)_2$ | $C_2H_5$ | $C_2H_5$ | f |
| 66 | Cl | 4 | $-NHCOCH_2N(C_2H_5)_2$ | $C_2H_5$ | $C_2H_5$ | f |
| 67 | Cl | 5 | H | $C_2H_5$ | $-C_2H_4NHCOCH_2\overset{\oplus}{N}(CH_3)_3 A^\ominus$ | e |
| 68 | Cl | 4 | H | $C_2H_5$ | $-C_2H_4NHCOCH_2\overset{\oplus}{N}(CH_3)_3 A^\ominus$ | f |
| 69 | Cl | 4 | H | $C_2H_5$ | $-C_2H_4NHCOCH_2N(C_2H_5)_2$ | f |
| 70 | Cl | 4 | $CH_3$ | $C_2H_5$ | $-C_2H_4NHCOCH_2N(C_2H_5)_2$ | f |
| 71 | H | 4 | $CH_3$ | $C_2H_5$ | $-C_2H_4NHCOCH_2N(C_2H_5)_2$ | f |
| 72 | Cl | 4 | H | $C_2H_5$ | $-C_2H_4NHCOCH_2N(CH_3)_2$ | f |
| 73 | Cl | 4 | $CH_3$ | $C_2H_5$ | $-C_2H_4NHCOCH_2N(CH_3)_2$ | f |
| 74 | Cl | 5 | H | $C_2H_5$ | $-C_2H_4NHCOCH_2N(CH_3)_2$ | f |
| 75 | $OCH_3$ | 5 | $-NHCOCH_3$ | H | $-COCH_2N(C_2H_5)_2$ | b |
| 76 | Cl | 4 | $-NHCOCH_3$ | H | $-COCH_2N(C_2H_5)_2$ | c |

TABLE 1-continued
compounds of formula (1)
| Ex. No. | $R_1$ | position of $-SO_2CH=CH_2$ | $R_4$ | $R_6$ | $R_7$ | shade on PA |
|---|---|---|---|---|---|---|
| 77 | H | 3 | $-NHCOCH_3$ | H | 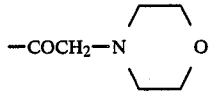 $-COCH_2-N\diagup\diagdown O$ | b |
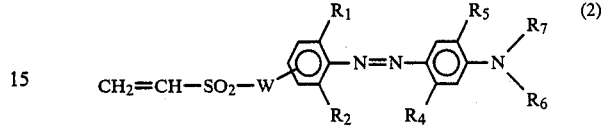
EXAMPLES 78 TO 97
By a method analogous to that of Examples 1 to 3 further compounds corresponding to formula (2) in which the symbols are listed in Table 2 below may be prepared using appropriate starting compounds.

TABLE 2 compounds of formula (2)

| Ex. No. | R₁ | W | position of -W-SO₂CH=CH₂ | R₂ | R₄ | R₅ | R₆ | R₇ | shade on PA |
|---|---|---|---|---|---|---|---|---|---|
| 78 | Br | direct bond | 4 | Br | CH₃ | H | C₂H₅ | —C₃H₆N(C₂H₅)₂ | d |
| 79 | Br | direct bond | 4 | Br | H | H | C₂H₅ | —C₃H₆N(C₂H₅)₂ | d |
| 80 | CN | direct bond | 4 | H | CH₃ | OCH₃ | C₂H₅ | —C₂H₄—N(morpholine) | f |
| 81 | CN | direct bond | 5 | H | H | OC₂H₅ | C₂H₅ | —C₂H₄—N(morpholine) | f |
| 82 | CH₃ | direct bond | 5 | H | —NHCOCH₃ | OCH₃ | same as R₇ | —C₂H₄—N(morpholine) | e |
| 83 | CH₃ | direct bond | 5 | H | —NHCOCH₃ | OC₂H₅ | C₂H₅ | —C₂H₄NHCOCH₂—N(morpholine) | e |
| 84 | H | direct bond | 3 | H | CH₃ | OCH₃ | C₂H₅ | —CH₂CHCH₂—N(morpholine), OH | e |
| 85 | H | —CH₂— | 3 | H | CH₃ | OCH₃ | C₂H₅ | —C₂H₄—N(morpholine) | c |
| 86 | Br | direct bond | 4 | Cl | —NHCOCH₃ | OC₂H₅ | H | —C₂H₄—(pyridyl) | k |
| 87 | Br | direct bond | 4 | Br | —NHCOCH₃ | OC₂H₅ | H | —C₂H₄—(pyridyl) | k |

TABLE 2-continued compounds of formula (2)

| Ex. No. | $R_1$ | W | position of —W—SO$_2$CH=CH$_2$ | $R_2$ | $R_4$ | $R_5$ | $R_6$ | $R_7$ | shade on PA |
|---|---|---|---|---|---|---|---|---|---|
| 88 | Br | direct bond | 4 | Br | —NHCOCH$_3$ | H | H | —C$_2$H$_4$-(2-pyridyl) | d |
| 89 | Br | direct bond | 4 | Br | CH$_3$ | H | C$_2$H$_5$ | —C$_2$H$_4$-(2-pyridyl) | d |
| 90 | Br | direct bond | 4 | CN | —NHCOCH$_3$ | H | H | —C$_2$H$_4$-(2-pyridyl) | l |
| 91 | Cl | direct bond | 4 | CN | —NHCOCH$_3$ | OC$_2$H$_5$ | H | —C$_2$H$_4$-(2-pyridyl) | j |
| 92 | Br | direct bond | 4 | Cl | —NHCOCH$_3$ | OC$_2$H$_5$ | H | —C$_2$H$_4$-(2-pyridyl) | K |
| 93 | Cl | direct bond | 4 | H | —NHCOCH$_3$ | OC$_2$H$_5$ | H | —C$_2$H$_4$-(2-pyridyl) | f |
| 94 | Br | direct bond | 4 | Br | —NHCOCH$_2$N(C$_2$H$_5$)$_2$ | OCH$_3$ | C$_2$H$_5$ | C$_2$H$_5$ —C$_2$H$_4$N(C$_2$H$_5$)$_2$ | m |
| 95 | H | —CH$_2$— | 4 | H | CH$_3$ | H | C$_2$H$_5$ | | d |
| 96 | H | —CH$_2$— | 3 | H | H | H | C$_2$H$_5$ | —C$_3$H$_6$-morpholino | c |
| 97 | Cl | —CH$_2$— | 4 | H | CH$_3$ | H | C$_2$H$_5$ | —C$_2$H$_4$N$^{\oplus}$(CH$_3$)$_3$A$^{\ominus}$ | d |

EXAMPLE 98

When an equimolar amount of the diazonium salt prepared as described in Example 1 is coupled at pH 8 with 33 parts of a compound of the formula

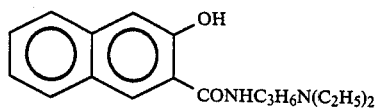

in 300 parts of water an orange dyestuff is obtained corresponding to the formula

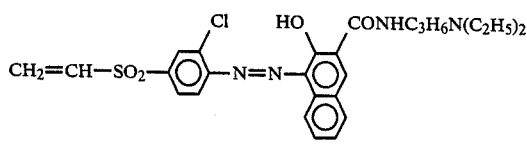

in acid addition salt form (depending on the reaction medium) which dyes wool as well as polyester/cotton fibre blends a brilliant orange shade.

EXAMPLE 99

An equimolar amount of the diazonium salt solution of 1-amino-4-vinylsulphonylbenzene prepared by a method analogous to that described in Example 1 is added dropwise to 27.2 parts of a compound of the formula

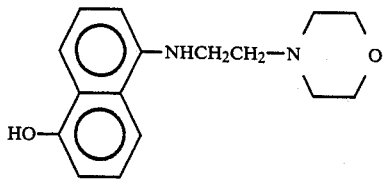

dissolved in 300 parts of acetic acid and 700 parts of water within 45 minutes whilst cooling with ice. Coupling is effected at pH 3.0 to 3.5 which is kept by the addition of sodium acetate. After three hours the resulting dark-blue solution is adjusted to a volume of 2.5 liters by adding the corresponding amount of water. This solution contains the dyestuff corresponding to the formula

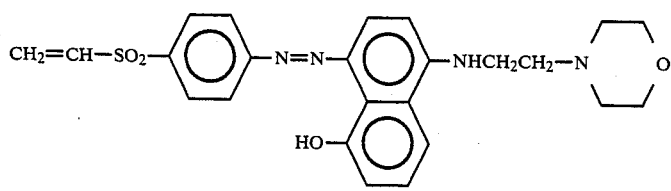

in acid addition salt form which dyes wool a reddish-blue shade.

EXAMPLES 100 TO 146

By a method analogous to that of Examples 1 to 3 and 99 further compounds according to the invention may be prepared from appropriate starting compounds. These dyestuffs correspond
(i) to formula (3)

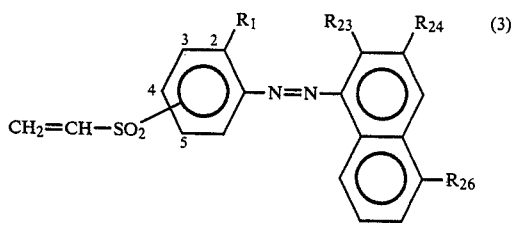

in which the symbols are defined in Table 3 below;
(ii) to formula (4)

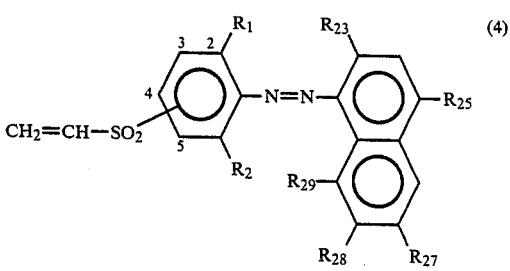

in which the symbols are defined in Table 4 below;
(iii) to formula (5)

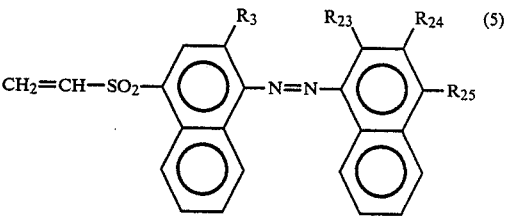

in which the symbols are defined in Table 5 below.
The groups $Z_{t1}$ and $Z_{t2}$ used in Tables 3 to 5 are defined as follows:
$Z_{t1}$ is a group, $-NHC_3H_6N(C_2H_5)_2$ and
$Z_{t2}$ is a group $-NHC_3H_6N(CH_3)_2$.

TABLE 3 compounds of formula (3)

| Ex. No. | R₁ | position of —SO₂CH=CH₂ | R₂₃ | R₂₄ | R₂₆ | shade on PA |
|---|---|---|---|---|---|---|
| 100 | Cl | 5 | OH | 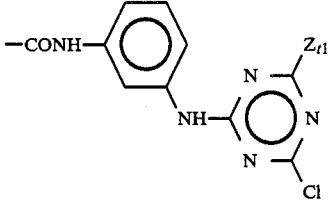 —CONH—⟨C₆H₄⟩—NH—(triazine with Zₜ₁ and Cl) | H | e |
| 101 | H | 3 | OH | 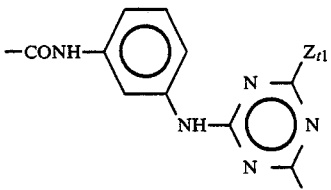 —CONH—⟨C₆H₄⟩—NH—(triazine with Zₜ₁ and Cl) | H | d |
| 102 | CN | 4 | OH | 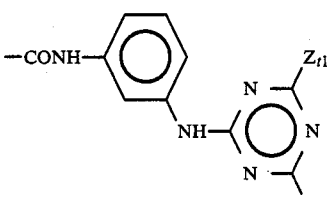 —CONH—⟨C₆H₄⟩—NH—(triazine with Zₜ₁ and Cl) | H | e |
| 103 | OCH₃ | 4 | OH | 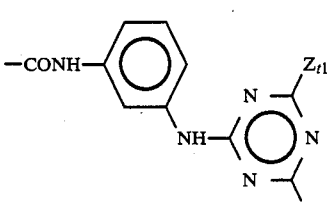 —CONH—⟨C₆H₄⟩—NH—(triazine with Zₜ₁ and Cl) | H | e |
| 104 | CH₃ | 4 | OH | 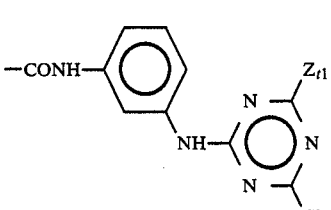 —CONH—⟨C₆H₄⟩—NH—(triazine with Zₜ₁ and Cl) | H | d |
| 105 | | | | 1:1 copper complex of Example 103 | | h |
| 106 | OCH₃ | 4 | OH | 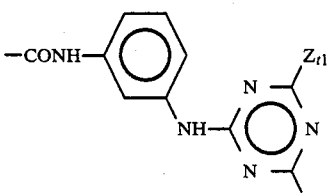 —CONH—⟨C₆H₄⟩—NH—(triazine with Zₜ₁ and Zₜ₁) | H | e |

TABLE 3-continued compounds of formula (3)

| Ex. No. | $R_1$ | position of $-SO_2CH=CH_2$ | $R_{23}$ | $R_{24}$ | $R_{26}$ | shade on PA |
|---|---|---|---|---|---|---|
| 107 | Cl | 4 | OH | -CONH-⟨C6H4⟩-NH-C(=N)triazine with $Z_{t1}$, $Z_{t1}$ | H | e |
| 108 | | | | 1:1 copper complex of Example 106 | | h |
| 109 | Cl | 5 | OH | -CONH-⟨C6H4⟩-NH-triazine with $Z_{t2}$, $Z_{t2}$ | H | e |
| 110 | $OCH_3$ | 4 | $NH_2$ | H | $-CH_2NHCOCH_2N(CH_3)_2$ | d |
| 111 | $CH_3$ | 4 | $NH_2$ | H | $-CH_2NHCOCH_2N(CH_3)_2$ | d |
| 112 | H | 4 | $NH_2$ | H | $-CH_2NHCOCH_2N(CH_3)_2$ | d |
| 113 | Cl | 5 | $NH_2$ | H | $-CH_2NHCOCH_2N(CH_3)_2$ | d |
| 114 | H | 4 | OH | $-CO-Z_{t1}$ | H | d |
| 115 | $OCH_3$ | 5 | OH | $-CO-Z_{t1}$ | H | e |
| 116 | Cl | 4 | OH | $-CO-Z_{t1}$ | H | d |
| 117 | | | | 1:1 copper complex of Example 114 | | g |
| 118 | | | | 1:1 copper complex of Example 115 | | h |

TABLE 4 compounds of formula (4)

| Ex. No. | $R_1$ | position of $-SO_2CH=CH_2$ | $R_2$ | $R_{23}$ | $R_{25}$ | $R_{27}$ | $R_{28}$ | $R_{29}$ | shade on PA |
|---|---|---|---|---|---|---|---|---|---|
| 119 | CN | 4 | H | OH | H | $-SO_2-Z_{t1}$ | H | H | m |
| 120 | Cl | 5 | H | OH | H | $-SO_2-Z_{t1}$ | H | H | m |
| 121 | H | 3 | H | OH | H | $-SO_2-Z_{t1}$ | H | H | m |
| 122 | $OCH_3$ | 4 | H | OH | H | $-SO_2-Z_{t1}$ | H | H | m |
| 123 | $CH_3$ | 4 | H | OH | H | $-SO_2-Z_{t1}$ | H | H | m |
| 124 | | | | | 1:1 copper complex of Example 122 | | | | g |
| 125 | $OCH_3$ | 5 | H | OH | H | H | $-NH-$triazine with $Z_{t1}$, $Z_{t1}$ | H | m |
| 126 | Cl | 5 | H | OH | H | H | $-NH-$triazine with $Z_{t1}$, $Z_{t1}$ | H | m |
| 127 | | | | | 1:1 copper complex of Example 125 | | | | g |
| 128 | CN | 4 | H | OH | H | H | $-NH-$triazine with $Z_{t2}$, $Z_{t2}$ | H | m |
| 129 | Cl | 4 | H | H | $-Z_{t1}$ | H | H | H | g |
| 130 | Cl | 4 | H | H | $-NHCOCH_2N(C_2H_5)_2$ | H | H | H | m |
| 131 | $OCH_3$ | 5 | H | H | $-NHCOCH_2N(C_2H_5)_2$ | H | H | OH | m |

TABLE 4-continued

| Ex. No. | R₁ | position of —SO₂CH=CH₂ | R₂ | R₂₃ | R₂₅ | R₂₇ | R₂₈ | R₂₉ | shade on PA |
|---|---|---|---|---|---|---|---|---|---|
| 132 | H | 3 | H | H | —NH—(triazine with Z$_{t1}$, Z$_{t1}$) | H | H | H | m |
| 133 | Cl | 4 | H | H | —NH—(triazine with Z$_{t1}$, Z$_{t1}$) | H | H | OH | m |
| 134 | Cl | 4 | H | H | —NHC₂H₄—(2-pyridyl) | H | H | OH | n |
| 135 | Br | 4 | Br | H | —NHC₂H₄—(2-pyridyl) | H | H | OH | n |
| 136 | Br | 4 | Cl | OH | H | —NH—(triazine with Z$_{t1}$, Z$_{t1}$) | H | H | n |

TABLE 5

| Ex. No. | R₁ | R₂₃ | R₂₄ | R₂₅ | shade on PA |
|---|---|---|---|---|---|
| 137 | H | H | H | —Z$_{t1}$ | g |
| 138 | OCH₃ | H | H | —Z$_{t1}$ | g |
| 139 | H | H | H | —NHC₂H₄N(C₂H₅)₂ | g |
| 140 | H | H | H | —NHC₂H₄N⁺(CH₃)₃ A⁻ | g |
| 141 | H | OH | —CO—Z$_{t1}$ | H | g |
| 142 | OCH₃ | OH | —CO—Z$_{t1}$ | H | g |
| 143 | | 1:1 copper complex of Example 142 | | | l |
| 144 | OCH₃ | OH | —CO—Z$_{t2}$ | H | g |
| 145 | | 1:1 copper complex of Example 144 | | | l |
| 146 | H | OH | —CONHC₃H₆N⁺(C₂H₅)₃ A⁻ | H | g |

EXAMPLE 147

18.3 Parts of 1-amino-3-vinylsulphonylbenzene are stirred into 300 parts glacial acetic acid at 20°. To this mixture 35 parts of 30% hydrochloric acid are added. Diazotisation is effected employing 6.9 parts of sodium nitrite in 25 parts of water and cooling with ice. After one hour any excess nitrous acid is decomposed by the addition of a small amount of sulphamic acid. The coupling reaction is carried out in accordance with conventional methods at pH 3 to 4 using a compound of the formula

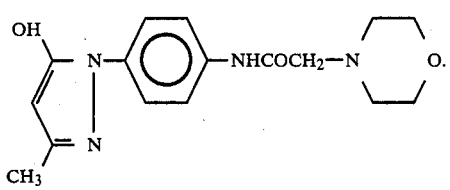

The resulting dyestuff which coresponds to the formula

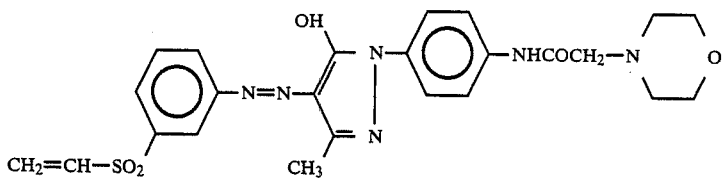

in acid addition salt form dyes wool a yellow shade. The dyeings show good light and wet fastness properties.

EXAMPLES 148 TO 166

By a method according to Examples 1 to 3 and 147 further dyestuffs may be prepared from appropriate starting compounds. They correspond to formula (6)

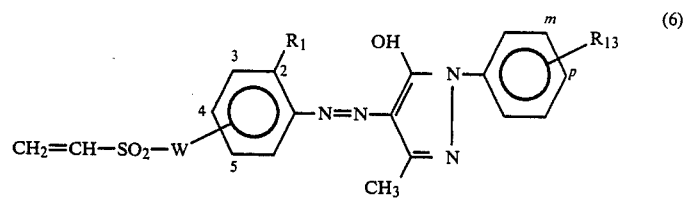

(6)

in which the symbols are as defined in Table 6 below.
In Table 6 —$Z_{t1}$ is a group —$NHC_3H_6N(C_2H_5)_2$.

TABLE 6

| | | | compounds of formula (6) | | |
|---|---|---|---|---|---|
| Ex. No. | $R_1$ | W | position of —W—$SO_2CH=CH_2$ | $R_{13}$ (position) | shade on PA |
| 148 | Cl | direct bond | 4 | —NHCOCH$_2$—⊕N⟨pyridine⟩ A⊖ (p) | b |
| 149 | H | direct bond | 4 | —NHCOCH$_2$—⊕N⟨pyridine⟩ A⊖ (m) | b |
| 150 | H | direct bond | 3 | —NHCOCH$_2$—⊕N⟨pyridine⟩ A⊖ (p) | b |
| 151 | H | —CH$_2$— | 4 | —NHCOCH$_2$—⊕N⟨pyridine⟩ A⊖ (p) | b |
| 152 | H | direct bond | 3 | —NHCOCH$_2$N(C$_2$H$_5$)$_2$ (p) | b |
| 153 | Cl | direct bond | 4 | —NHCOCH$_2$N(C$_2$H$_5$)$_2$ (m) | b |
| 154 | Cl | direct bond | 4 | —NHCOCH$_2$N(C$_2$H$_5$)$_2$ (p) | b |
| 155 | Cl | —CH$_2$— | 5 | —NHCOCH$_2$N(C$_2$H$_5$)$_2$ (p) | b |
| 156 | H | direct bond | 3 | —NHCOCH$_2$N(CH$_3$)$_2$ (p) | b |
| 157 | Cl | direct bond | 4 | —NHCOCH$_2$—N⟨morpholino⟩O (p) | b |
| 158 | H | direct bond | 4 | —NHCOCH$_2$—N⟨morpholino⟩O (m) | b |

TABLE 6-continued

| Ex. No. | $R_1$ | W | position of $-W-SO_2CH=CH_2$ | $R_{13}$ (position) | shade on PA |
|---|---|---|---|---|---|
| 159 | H | $-CH_2-$ | 4 | $-NHCOCH_2-N\underset{\diagdown\_\_\diagup}{\overset{\diagup\_\_\diagdown}{\phantom{N}}}O$ (p) | b |
| 160 | $OCH_3$ | direct bond | 5 | $-NHCOCH_2\overset{\oplus}{N}(CH_3)_3\ A^\ominus$ (p) | b |
| 161 | | | 1:1 copper complex of Example 160 | | brownish-yellow |
| 162 | $CH_3$ | direct bond | 5 | $-CO-Z_{t1}$ (m) | b |
| 163 | H | direct bond | 4 | $-CO-Z_{t1}$ (p) | b |
| 164 | Cl | direct bond | 5 | 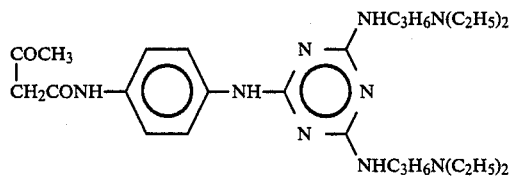 (m) | b |
| 165 | H | direct bond | 3 | (p) structure with $-NH-$ triazine bearing $Z_{t1}$ groups | b |
| 166 | H | direct bond | 3 | $-NHCOCH_2-\overset{\oplus}{\underset{CH_3}{N}}\underset{\diagdown\_\_\diagup}{\overset{\diagup\_\_\diagdown}{\phantom{N}}}O\ A^\ominus$ (m) | b |

EXAMPLE 167

An equimolar amount of the diazonium salt as described in Example 147 is coupled with a solution of 55 parts of a compound having the formula

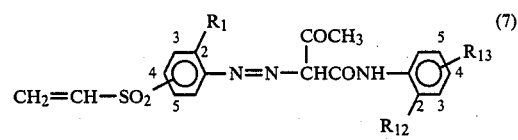

in 500 parts of water. The dyestuff obtained which corresponds to the formula

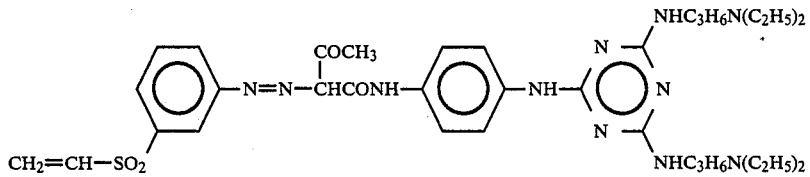

in acid addition salt form dyes wool in greenish-yellow shades.

EXAMPLES 168 TO 185

By a method according to that of Examples 1 to 3 and 167 further dyestuffs may be prepared from appropriate starting compounds which are listed in Table 7 below. They correspond to formula (7)

$$CH_2=CH-SO_2\underset{5}{\overset{4}{\underset{\phantom{4}}{\bigcirc}}}\overset{3\ \ R_1}{\underset{\phantom{3}}{\phantom{\bigcirc}}}-N=N-\overset{COCH_3}{\underset{\phantom{C}}{CHCONH}}-\underset{2\ \ 3}{\overset{5\ \ R_{13}}{\underset{\phantom{5}}{\bigcirc}}}\ R_{12} \quad (7)$$

in which the symbols are defined in Table 7.

TABLE 7

| Ex. No. | $R_1$ | position of $-SO_2CH=CH_2$ | $R_{12}$ | $R_{13}$ (position) | shade on PA |
|---|---|---|---|---|---|
| 168 | Cl | 4 | H | $-NHCOCH_2N(C_2H_5)_2$ (4) | a |
| 169 | $CH_3$ | 5 | H | $-NHCOCH_2N(C_2H_5)_2$ (4) | a |
| 170 | H | 4 | H | $-NHCOCH_2N(C_2H_5)_2$ (4) | a |
| 171 | H | 4 | $OCH_3$ | $-NHCOCH_2N(C_2H_5)_2$ (5) | a |
| 172 | H | 3 | H | $-NHCOCH_2N(CH_3)_2$ (3) | a |

TABLE 7-continued compounds of formula (7)

| Ex. No. | R₁ | position of —SO₂CH=CH₂ | R₁₂ | R₁₃ (position) | shade on PA |
|---|---|---|---|---|---|
| 173 | Cl | 4 | H | —NHCOCH₂N⁺(CH₃)₃ A⁻ (3) | a |
| 174 | CN | 4 | H | —NHCOCH₂N⁺(CH₃)₃ A⁻ (3) | a |
| 175 | Cl | 4 | H | —NHCOCH₂—N(morpholino) (4) | a |
| 176 | H | 3 | OCH₃ | —NHCOCH₂—N(morpholino) (5) | a |
| 177 | CH₃ | 5 | H | —NHCOCH₂—N(morpholino) (3) | a |
| 178 | Cl | 4 | H | —CONHC₃H₆N(C₂H₅)₂ (3) | a |
| 179 | Cl | 4 | OCH₃ | —CONHC₃H₆N(C₂H₅)₂ (5) | a |
| 180 | OCH₃ | 4 | H | —CONHC₃H₆N(C₂H₅)₂ (3) | a |
| 181 | H | 3 | H | —CONHC₃H₆N(C₂H₅)₂ (3) | a |
| 182 | H | 4 | H | —CONHC₃H₆N⁺(C₂H₅)₃ A⁻ (4) | a |
| 183 | Cl | 4 | H | —NHCOCH₂—⁺N(pyridinium) A⁻ (4) | a |
| 184 | CN | 5 | H | —NHCOCH₂—⁺N(pyridinium) A⁻ (4) | a |
| 185 | H | 3 | H | —NHCOCH₂—⁺N(pyridinium) A⁻ (4) | a |

EXAMPLE 186

When the diazonium salt as defined in Example 1 is coupled with a compound of the formula

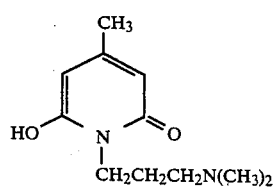

a dyestuff is obtained having the formula

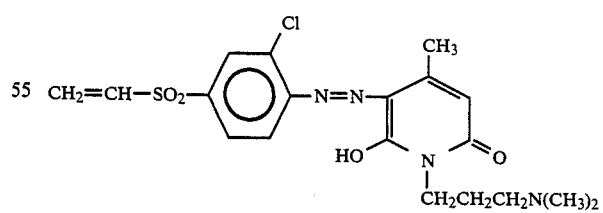

in acid addition salt form which dyes polyacrylonitrile a greenish-yellow shade.

EXAMPLES 187 TO 233

By a method analogous to that of Examples 1 to 3 and 186 further compounds may be prepared from appropriate starting compounds. The resulting dyestuffs correspond to formula (8)

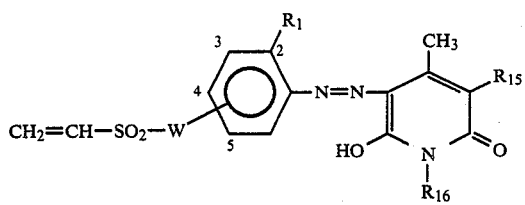

(8)

in which the symbols are defined in Table 8 below. In this Table 8 $Z_{t1}$ is a group $-NHC_3H_6N(C_2H_5)_2$ and $Z_{t2}$ is a group $-NHC_3H_6N(CH_3)_2$.

TABLE 8
compounds of formula (8)

| Ex. No. | $R_1$ | W | position of $-W-SO_2CH=CH_2$ | $R_{15}$ | $R_{16}$ | shade on PAC |
|---|---|---|---|---|---|---|
| 187 | Cl | direct bond | 4 | ![pyridinium] $-\overset{\oplus}{N}\diagup\diagdown A^{\ominus}$ | H | brownish-yellow |
| 188 | CN | direct bond | 5 | $-\overset{\oplus}{N}\diagup\diagdown A^{\ominus}$ | $-C_3H_6N(C_2H_5)_2$ | a |
| 189 | $OCH_3$ | direct bond | 5 | $-\overset{\oplus}{N}\diagup\diagdown A^{\ominus}$ | $-C_3H_6N(C_2H_5)_2$ | a |
| 190 | H | direct bond | 4 | $-\overset{\oplus}{N}\diagup\diagdown A^{\ominus}$ | $-C_3H_6N(C_2H_5)_2$ | a |
| 191 | Cl | direct bond | 4 | $-\overset{\oplus}{N}\diagup\diagdown A^{\ominus}$ | $-C_3H_6N(C_2H_5)_2$ | a |
| 192 | Cl | direct bond | 4 | CN | $-C_3H_6N(C_2H_5)_2$ | a |
| 193 | $OCH_3$ | direct bond | 5 | CN | $-C_3H_6N(C_2H_5)_2$ | b |
| 194 | Cl | direct bond | 4 | $CONH_2$ | $-C_3H_6N(C_2H_5)_2$ | a |
| 195 | Cl | direct bond | 4 | $CONH_2$ | $-C_3H_6N(CH_3)_2$ | a |
| 196 | H | direct bond | 3 | $CONH_2$ | $-C_3H_6N(CH_3)_2$ | a |
| 197 | $OCH_3$ | direct bond | 5 | $CONH_2$ | $-C_3H_6N(CH_3)_2$ | a |
| 198 | H | $-CH_2-$ | 4 | $CONH_2$ | $-C_3H_6N(CH_3)_2$ | a |
| 199 | H | $-CH_2-$ | 4 | $CONH_2$ | $-C_3H_6\overset{\oplus}{N}(CH_3)_3 A^{\ominus}$ | a |
| 200 | H | $-CH_2-$ | 4 | H | $-C_3H_6\overset{\oplus}{N}(CH_3)_3 A^{\ominus}$ | a |
| 201 | Cl | direct bond | 4 | CN | $-C_3H_6\overset{\oplus}{N}(CH_3)_3 A^{\ominus}$ | b |
| 202 | Cl | direct bond | 4 | H | $-C_3H_6N(CH_3)_2$ | a |
| 203 | H | direct bond | 3 | H | $-C_3H_6N(CH_3)_2$ | a |
| 204 | $OCH_3$ | direct bond | 5 | H | $-C_3H_6N(CH_3)_2$ | a |
| 205 | H | $-CH_2-$ | 4 | H | $-C_3H_6N(CH_3)_2$ | a |
| 206 | H | $-CH_2-$ | 4 | H | $-C_2H_4-N\diagup\diagdown NH$ | a |

TABLE 8-continued compounds of formula (8)

| Ex. No. | R₁ | W | position of —W—SO₂CH=CH₂ | R₁₅ | R₁₆ | shade on PAC |
|---|---|---|---|---|---|---|
| 207 | Cl | direct bond | 4 | H | 4-[(4,6-di-$Z_{t1}$-triazin-2-yl)amino]phenyl | a |
| 208 | H | direct bond | 3 | H | 4-[(4,6-di-$Z_{t1}$-triazin-2-yl)amino]phenyl | a |
| 209 | Cl | direct bond | 5 | CONH₂ | 4-[(4,6-di-$Z_{t1}$-triazin-2-yl)amino]phenyl | a |
| 210 | Cl | direct bond | 4 | —CH₂NHCOCH₂N(C₂H₅)₂ | C₂H₅ | a |
| 211 | H | direct bond | 4 | —CH₂NHCOCH₂N(C₂H₅)₂ | C₂H₅ | a |
| 212 | H | direct bond | 3 | —CH₂NHCOCH₂N(C₂H₅)₂ | H | a |
| 213 | CH₃ | direct bond | 4 | —CH₂NHCOCH₂N(C₂H₅)₂ | H | a |
| 214 | OCH₃ | direct bond | 4 | —CH₂NHCOCH₂N(C₂H₅)₂ | H | a |
| 215 | H | —CH₂— | 4 | —CH₂NHCOCH₂N(C₂H₅)₂ | H | a |
| 216 | H | —CH₂— | 4 | —CH₂NHCOCH₂N(C₂H₅)₂ | C₂H₅ | a |
| 217 | H | direct bond | 3 | —CH₂NHCOCH₂N(C₂H₅)₂ | —C₃H₆N(C₂H₅)₂ | a |
| 218 | Cl | direct bond | 4 | —CH₂NHCOCH₂N(C₂H₅)₂ | —C₃H₆N(C₂H₅)₂ | a |
| 219 | Cl | direct bond | 4 | —CH₂NHCOCH₂—N(morpholino) | C₂H₅ | a |
| 220 | H | direct bond | 3 | —CH₂NHCOCH₂—N(morpholino) | C₂H₅ | a |
| 221 | H | direct bond | 4 | —CH₂NHCOCH₂—N(morpholino) | H | a |
| 222 | Cl | direct bond | 5 | —CH₂NHCOCH₂—N(morpholino) | —C₃H₆N(CH₃)₂ | a |
| 223 | H | direct bond | 4 | —CH₂NHCOCH₂—N(morpholino) | —C₃H₆N(CH₃)₂ | a |
| 224 | Cl | direct bond | 4 | —CH₂NHCOCH₂N⁺(CH₃)₃A⁻ | C₂H₅ | a |

TABLE 8-continued compounds of formula (8)

| Ex. No. | $R_1$ | W | position of $-W-SO_2CH=CH_2$ | $R_{15}$ | $R_{16}$ | shade on PAC |
|---|---|---|---|---|---|---|
| 225 | H | direct bond | 4 | $-CH_2NHCOCH_2\overset{\oplus}{N}(CH_3)_3A^{\ominus}$ | $C_2H_5$ | a |
| 226 | H | direct bond | 3 | $-CH_2NHCOCH_2\overset{\oplus}{N}(CH_3)_3A^{\ominus}$ | H | a |
| 227 | H | direct bond | 4 | $-CH_2NHCOCH_2\overset{\oplus}{N}(CH_3)_3A^{\ominus}$ | $-C_3H_6\overset{\oplus}{N}(CH_3)_3A^{\ominus}$ | a |
| 228 | Cl | direct bond | 4 | $-CH_2NHCOCH_2\overset{\oplus}{N}(CH_3)_3A^{\ominus}$ | $-C_3H_6\overset{\oplus}{N}(CH_3)_3A^{\ominus}$ | a |
| 229 | H | direct bond | 4 | $-CH_2NHCOCH_2\overset{\oplus}{N}(CH_3)_3A^{\ominus}$ | $-C_3H_6N(CH_3)_2$ | a |
| 230 | H | $-CH_2-$ | 4 | $-CH_2NHCOCH_2\overset{\oplus}{N}(CH_3)_3A^{\ominus}$ | $-C_3H_6N(CH_3)_2$ | a |
| 231 | H | direct bond | 3 | $-CH_2NHCOCH_2\overset{\oplus}{N}(CH_3)_3A^{\ominus}$ | 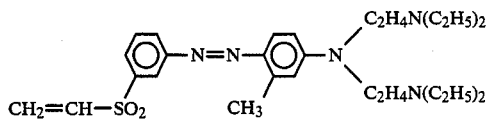 | a |
| 232 | H | direct bond | 4 | $-CH_2NHCOCH_2N(CH_3)_2$ | $-C_3H_6N(CH_3)_2$ | a |
| 233 | Cl | direct bond | 4 | $-CH_2NHCOCH_2N(CH_3)_2$ | $C_2H_5$ | a |

The coupling compounds used for the preparation of the dyestuffs of Examples 210 to 233 in Table 8 can be obtained by reacting a halogen containing compound of Example 1 of DE-OS No. 22 37 006 with a secondary or tertiary amine such as dimethyl- or diethylamine, morpholine or trimethylamine in accordance with known methods.

EXAMPLE 234

20 Parts of 1-amino-3-(2'-hydroxyethyl)sulphonylbenzene are diazotised in accordance with the method described in Example 1. This diazonium salt is coupled with 27 parts of a compound of the formula

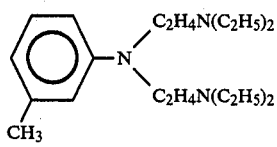

in 200 parts of water and 30 parts of glacial acetic acid. A compound having the formula

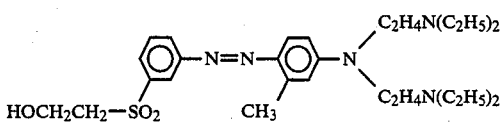

is obtained which precipitates in alkaline medium, and is separated by filtration and dried. The product is added to 250 parts of concentrated sulphuric acid at 0° to 5° whilst stirring vigorously. The temperature is allowed to rise slowly to 20°. Subsequently, the dark reaction mixture is poured onto 100 parts of ice. The pH is adjusted to ca. 10 with the addition of a 30% sodium hydroxide solution, the dyestuff precipitates increasingly and is separated by filtration after two hours. A dyestuff having the formula in acid addition salt form is obtained which dyes natural and synthetic polyamide fibres a bright golden-yellow shade.

By a method analogous to that described in Example 234 the vinylsulphonyl group can be introduced into any diazo component disclosed in the Examples hereinbefore.

EXAMPLE 235

The diazonium salt solution prepared in Example 99 is added dropwise at 0° to 5° to a solution of 15.3 parts of 2,5-dimethoxyaniline in 50 parts of glacial acetic acid and 150 parts of water within 30 minutes. The product which precipitates is filtered, washed with water and dried.

3.8 Parts of the above product are suspended in 50 parts of warm acetic acid and 5.8 parts of a 30% hydrochloric acid are added. To the resulting red solution a solution of 0.69 parts of sodium nitrite in 10 parts of water is added dropwise. The suspension is stirred for one hour at 0° to 5°. Subseqently, any excess nitrous acid is decomposed by the addition of a small amount of sulphamic acid. The diazonium suspension is then added to a mixture containing 2.9 parts of a compound of the formula

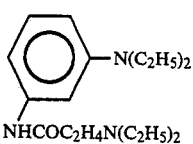

in 60 parts of methanol and 40 parts of water. Stirring is effected for a further two hours. The pH is kept at ca. 3 during coupling by the addition of sodium acetate and is subsequently adjusted to 4.5. The resulting disazo dyestuff which precipitates is filtered, washed and dried. It corresponds to the formula

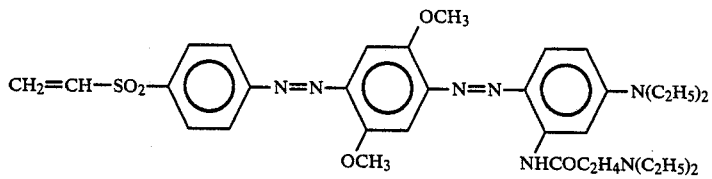

in acid addition salt form and dyes wool a reddish-blue shade.

EXAMPLES 236 TO 249

By a method analogous to that of Example 235 further disazo compounds may be prepared from appropriate starting compounds. They correspond to formula (9)

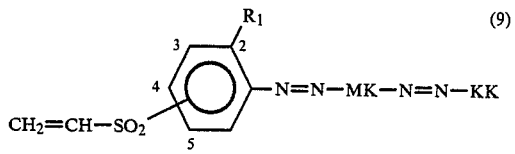

in which the symbols are defined in Table 9 below.

In any middle component MK*) denotes the carbon atom bound to —N=N—KK.

TABLE 9

| Ex. No. | $R_1$ | position of —SO$_2$CH=CH$_2$ | MK (compounds of formula (9)) | KK | shade on PA |
|---|---|---|---|---|---|
| 236 | H | 3 | 2,4-di-OCH$_3$-phenyl | 3-CH$_3$-4-N(C$_2$H$_5$)(C$_3$H$_6$N(C$_2$H$_5$)$_2$)-phenyl | 1 |
| 237 | H | 3 | 2,4-di-OCH$_3$-phenyl | 4-N(C$_2$H$_5$)$_2$-2-NHCOC$_2$H$_4$N(C$_2$H$_5$)$_2$-phenyl | 1 |
| 238 | Cl | 4 | 2,4-di-OCH$_3$-phenyl | 4-N(C$_2$H$_5$)$_2$-2-NHCOC$_2$H$_4$N(C$_2$H$_5$)$_2$-phenyl | 1 |
| 239 | Cl | 4 | 2-OCH$_3$-phenyl | 4-N(C$_2$H$_5$)$_2$-2-NHCOC$_2$H$_4$N(C$_2$H$_5$)$_2$-phenyl | 1 |
| 240 | Cl | 4 | 2-OCH$_3$-5-CH$_3$-phenyl | 4-N(C$_2$H$_5$)$_2$-2-NHCOC$_2$H$_4$N(C$_2$H$_5$)$_2$-phenyl | 1 |

TABLE 9-continued

| Ex. No. | $R_1$ | position of $-SO_2CH=CH_2$ | compounds of formula (9) MK | KK | shade on PA |
|---|---|---|---|---|---|
| 241 | H | 4 | 4-(HNCOCH$_3$)phenyl (* marked) | 4-N(C$_2$H$_5$)$_2$, 2-NHCOC$_2$H$_4$N(C$_2$H$_5$)$_2$ phenyl | j |
| 242 | Cl | 4 | 2,5-di-OCH$_3$ phenyl | HO, CONHC$_3$H$_6$N(C$_2$H$_5$)$_2$ naphthyl | l |
| 243 | H | 3 | 2,5-di-OCH$_3$ phenyl | HO, CONHC$_3$H$_6$N(C$_2$H$_5$)$_2$ naphthyl | l |
| 244 | | 1:1 copper complex of Example 239 (spanning MK—N=N—KK) | | | i |
| 245 | | 1:1 copper complex of Example 240 (spanning MK—N=N—KK) | | | o |
| 246 | H | 3 | naphthyl | 3-CH$_3$, N(C$_2$H$_5$)(C$_3$H$_6$N(C$_2$H$_5$)$_2$) phenyl | l |
| 247 | H | 3 | naphthyl | 3-CH$_3$, N(C$_2$H$_5$)(CH$_2$CH(OH)CH$_2$N(C$_2$H$_5$)$_2$) phenyl | l |
| 248 | H· | 3 | naphthyl | NHC$_3$H$_6$N(C$_2$H$_5$)$_2$ naphthyl | m |
| 249 | H | 3 | naphthyl | HO, CONHC$_3$H$_6$N(C$_2$H$_5$)$_2$ naphthyl | m |

In the following examples the application of the dyestuffs of this invention is illustrated.

To a dyebath of 25° containing in 1000 parts of water 0.2 parts of the dyestuff of Example 1, 20 parts of wool-gaberdine are added. The pH of the bath is adjusted to 4–5. The dyebath is heated to 98° within 60 minutes, and dyeing is effected at this temperature for 60 minutes. The water that evaporates during dyeing is continuously replaced. Subsequently, the dyed wool fabric is removed from the liquor and is added to a fresh bath containing in 1000 parts of water 5 parts of acetic acid (100%). The bath is heated at the boil for 30 minutes. After rinsing and drying a red wool dyeing is obtained showing a high degree of levelness and having good light and wet fastness properties.

APPLICATION EXAMPLE B

To a dyebath of 25° containing in 1000 parts of water 0.4 parts of the dyestuff of Example 3, 20 parts of synthetic polyamide fabric, for example nylon 66 yarn, are added. Dyeing is effected in analogous manner to the method described in Application Example A. After rinsing and drying a level scarlet polyamide dyeing is obtained having good wet fastness properties.

APPLICATION EXAMPLE C

To a dyebath of 25° containing in 1000 parts of water 0.1 parts of the dyestuff of Example 4, 20 parts of unloaded natural silk fabric are added. Dyeing is effected in accordance with the method described in Application Example A with the exception that the silk dyeing is treated for only 15 minutes in the fresh bath. After rinsing and drying an orange dyeing is obtained having good wet fastness properties.

APPLICATION EXAMPLE D

A polyester-cotton fibre blend (50:50) is padded with a liquor consisting of:
15 parts of the dyestuff of Example 3
100 parts urea and
885 parts water
at 25°. The fabric is squeezed to reduce the total pick-up to ca. 80%, is dried at 100° and is then treated for 90 seconds at 210° for fixation. Subsequently, the dyeing is treated with a bath containing in 1000 parts aqueous liquor
200 parts sodium chloride
150 parts sodium carbonate (calcined) and
20 parts sodium hydroxide solution (36° Be)
at 85°. In order to remove any excess dyestuff the dyeing is rinsed with cold water and is then treated with an aqueous solution of 90° containing in 1000 parts
1 part of a non-ionic soaping agent and
1 part acetic acid (100%)
for 5 minutes. Finally, the dyeing is rinsed with cold water. An orange dyeing is obtained having good light and wet fastness properties. In this dyeing both fibre portions are dyed on-tone having the same depth.

Any one of the dyestuffs of Examples 2 and 5 to 249 which are in acid addition salt form or in quaternary ammonium salt form may be used in place of the dyestuffs of Examples 1, 3 and 4 in any one of Application Examples A to D.

List of maximum absorption wavelengths ($\lambda_{max.}$ in nanometer nm) available for the dyestuffs of Examples 1 to 249. Measurement was carried out in demineralised water.

| Ex. No. | $\lambda_{max.}$ | Ex. No. | $\lambda_{max.}$ | Ex. No. | $\lambda_{max.}$ | Ex. No. | $\lambda_{max.}$ |
|---|---|---|---|---|---|---|---|
| 1 | 499 | 46 | 491 | 98 | 488 | 204 | 410 |
| 2 | 452 | 51 | 488 | 99 | 587 | 205 | 420 |
| 3 | 495 | 52 | 483 | 114 | 463 | 206 | 422 |
| 7 | 470 | 53 | 478 | 115 | 478 | 234 | 438 |
| 8 | 476 | 54 | 496 | 117 | 560 | 235 | 604 |
| 9 | 473 | 55 | 491 | 118 | 538 | 236 | 575 |
| 11 | 439 | 56 | 497 | 125 | 488 | 237 | 598 |
| 12 | 428 | 57 | 497 | 127 | 522 | 238 | 597 |
| 13 | 426 | 58 | 499 | 129 | 554 | 242 | 553 |
| 14 | 443 | 59 | 495 | 137 | 524 | 243 | 567 |
| 16 | 472 | 60 | 498 | 141 | 538 | 244 | 560 |
| 17 | 361 | 61 | 472 | 143 | 568 | 245 | 575 |
| 19 | 433 | 64 | 515 | 147 | 402 | 246 | 579 |
| 20 | 438 | 65 | 516 | 148 | 393 | 247 | 559 |
| 21 | 468 | 66 | 516 | 154 | 396 | 248 | 569 |
| 22 | 465 | 69 | 490 | 157 | 395 | 249 | 573 |
| 23 | 372 | 70 | 491 | 159 | 398 | | |
| 24 | 454 | 71 | 489 | 160 | 398 | | |
| 25 | 495 | 72 | 490 | 165 | 396 | | |
| 28 | 472 | 73 | 491 | 167 | 379 | | |
| 29 | 468 | 74 | 489 | 183 | 414 | | |
| 30 | 468 | 75 | 378 | 187 | 419 | | |
| 33 | 454 | 76 | 371 | 193 | 441 | | |
| 34 | 452 | 77 | 372 | 195 | 413 | | |
| 35 | 442 | 79 | 460 | 196 | 413 | | |
| 36 | 438 | 88 | 465 | 197 | 432 | | |
| 37 | 452 | 89 | 461 | 198 | 415 | | |
| 38 | 463 | 90 | 537 | 199 | 417 | | |
| 39 | 465 | 91 | 564 | 200 | 418 | | |
| 44 | 465 | 92 | 564 | 202 | 414 | | |
| 45 | 462 | 93 | 510 | 203 | 408 | | |

We claim:
1. A metal-free compound of the formula

Da—N=N—Ka, a 1:1 or 1:2 metal complex of a metallizable metal-free compound of said formula or an acid addition salt of a metal-free compound of said formula or of a 1:1 or 1:2 metal complex of a metallizable metal-free compound of said formula, wherein
Da is

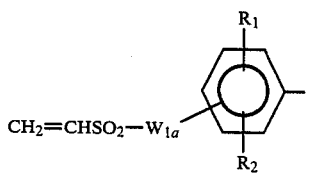

or

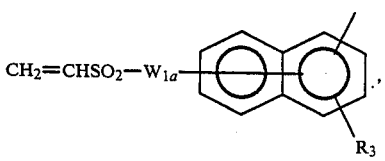

wherein
each of $R_1$ and $R_2$ is independently hydrogen, halo, hydroxy, cyano, nitro, trifluoromethyl, carboxy, $C_{1-4}$alkyl, $C_{1-4}$alkoxy, phenoxy, phenoxy substituted by 1 to 3 halo substituents, sulfamoyl, $C_{1-4}$alkylsulfamoyl, di-($C_{1-4}$alkyl)sulfamoyl, $C_{1-}$ 4alkylsulfonyl, (C$_{1-4}$alkyl)carbonylamino, benzamido or phenylamino, R$_3$ is hydrogen, halo, hydroxy, amino, C$_{1-4}$alkyl, C$_{1-4}$alkoxy, phenoxy, phenylamino, C$_{1-4}$alkylamino, di-(C$_{1-4}$alkyl)amino, (C$_{1-4}$alkyl)carbonylamino or benzamido, and W$_{1a}$ is a direct bond; W$_3$; linear or branched C$_{2-6}$alkenylene; linear or branched C$_{1-6}$alkylene or linear or branched C$_{2-6}$alkenylene monosubstituted by halo, hydroxy, C$_{1-4}$alkoxy or phenyl; linear or branched alkylene or linear or branched alkenylene having a maximum of 6 carbon atoms which is interrupted by a nitrogen, oxygen or sulfur atom; linear or branched alkylene or linear or branched alkenylene having a maximum of 6 carbon atoms which is monosubstituted by halo, hydroxy, C$_{1-4}$alkoxy or phenyl and interrupted by a nitrogen, oxygen or sulfur atom; —NH—X$_a$—; —CONH—X$_a$—; —NHCO—X$_a$—; —CO—X$_a$—; —SO$_2$NH—X$_a$—; —NHNHCO—X$_a$—; —CH$_2$—CONH—CH$_2$— or —CH$_2$—NHCO—CH$_2$—, wherein X$_a$ is linear or branched C$_{1-4}$alkylene or linear or branched C$_{2-4}$alkenylene, with the proviso that when W$_{1a}$ contains an X$_a$ radical, the X$_a$ radical is attached to the CH$_2$=CH—SO$_2$— group, and Ka is

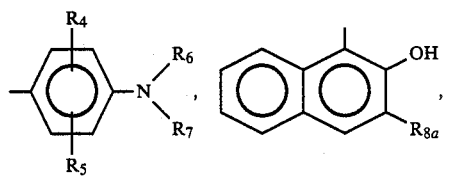

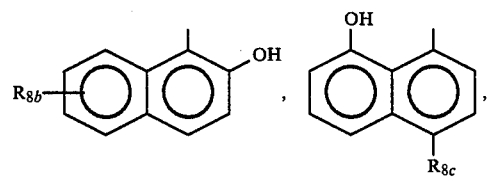

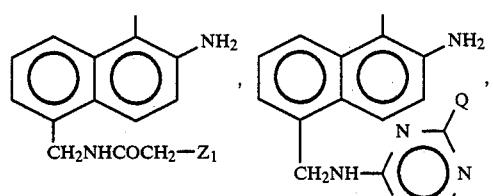

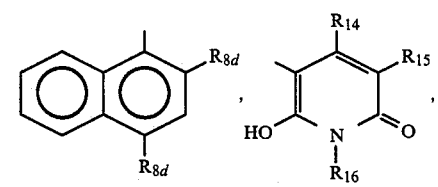

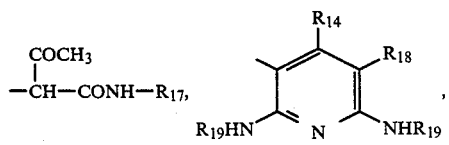

-continued

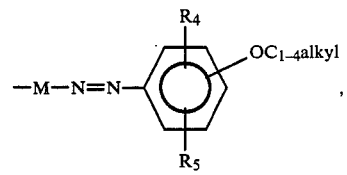

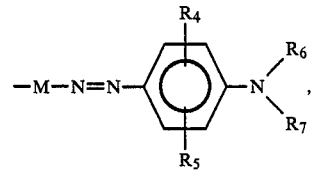

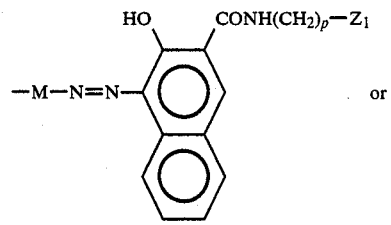

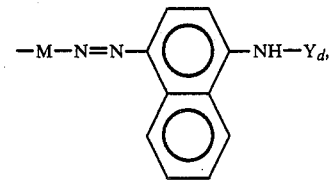

wherein
M is

wherein R$_4$ and R$_5$ are as defined below,

R$_4$ is hydrogen, halo, hydroxy, C$_{1-4}$alkyl, C$_{1-4}$alkoxy, (C$_{1-4}$alkyl)carbonylamino, ureido, sulfamoyl, C$_{1-4}$alkylsulfamoyl, di-(C$_{1-4}$alkyl)sulfamoyl, —NHCO—(CH$_2$)$_p$—Z$_1$ or —SO$_2$N[(CH$_2$)$_p$—Z$_1$]$_2$, R$_5$ is hydrogen, C$_{1-4}$alkyl, C$_{1-4}$alkoxy, halo or hydroxy, R$_6$ is hydrogen; C$_{1-6}$alkyl; C$_{1-6}$alkyl monosubstituted by hydroxy, phenyl, halo or cyano or disubstituted by hydroxy; —(CH$_2$)$_p$—NHCO—(CH$_2$)$_p$—Z$_1$; —W$_3$—Z$_1$ or linear or branched C$_{1-6}$alkylene-Z$_1$ the alkylene radical of which is substituted by 1 or 2 hydroxy groups, R$_7$ is hydrogen; C$_{1-6}$alkyl; C$_{1-6}$alkyl monosubstituted by hydroxy, phenyl, halo or cyano or disubstituted by hydroxy; —CO—CH$_2$—Z$_1$; linear or branched C$_{1-8}$alkylene-Z$_1$; linear or branched C$_{1-8}$alkylene-Z$_1$ the alkylene radical of which is substituted by 1 or 2 hydroxy groups; linear or branched alkylene-Z$_1$ the alkylene radical of which has a maximum of 8 carbon atoms and is interrupted by —NH—, —NCH₃—, —S—, —O—, —NHCO— or —OCO—; linear or branched alkylene-Z₁ the alkylene radical of which has a maximum of 8 carbon atoms and is substituted by 1 or 2 hydroxy groups and interrupted by —NH—, —NCH₃—, —S—, —O—, —NHCO— or —OCO—; or

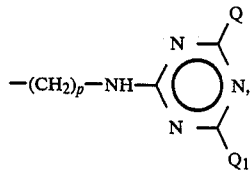

R$_{8a}$ is —CONH—(CH$_2$)$_p$—Z$_1$,

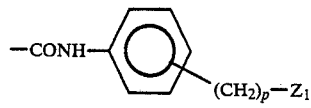

or

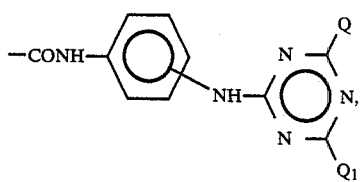

R$_{8b}$ is —NHCO—(CH$_2$)$_p$—Z$_1$, —SO$_2$NH—(CH$_2$)$_p$—Z$_1$ or

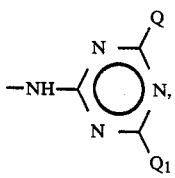

R$_{8c}$ is —NHCO—(CH$_2$)$_p$—Z$_1$, —NH—(CH$_2$)$_p$—Z$_1$ or

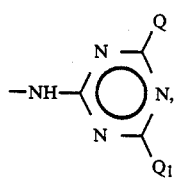

one R$_{8d}$ is hydrogen and the other is —CONH—(CH$_2$)$_p$—Z$_1$, —NHCO—(CH$_2$)$_p$—Z$_1$, —SO$_2$NH—(CH$_2$)$_p$—Z$_1$, —NH—(CH$_2$)$_p$—Z$_1$ or

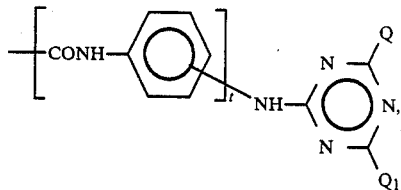

R$_{14}$ is hydrogen, C$_{1-4}$alkyl, phenyl, benzyl or cyclohexyl,

R$_{15}$ is hydrogen, cyano, carbamoyl, sulfamoyl, pyridinium A⊖ or —CH$_2$—NHCO—CH$_2$—Z$_1$, R$_{16}$ is hydrogen; amino; phenylamino; C$_{1-4}$alkyl; C$_{1-4}$alkyl monosubstituted by hydroxy, cyano, halo or C$_{1-4}$alkoxy; —W$_3$—Z$_1$;

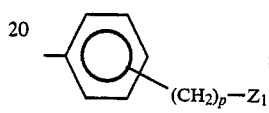

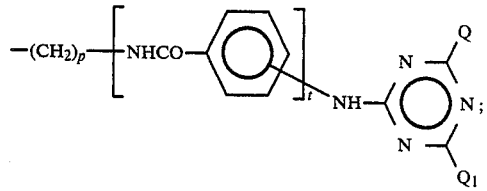

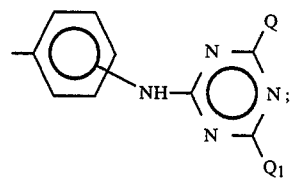

—(CH$_2$)$_p$—NHCO—(CH$_2$)$_p$—Z$_1$ or

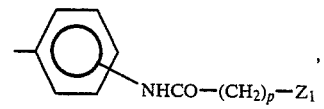

R$_{17}$ is —W$_3$—Z$_1$ or

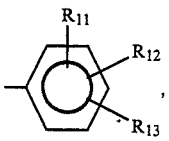

wherein each of R$_{11}$ and R$_{12}$ is independently hydrogen, halo, nitro, amino, cyano, hydroxy, C$_{1-4}$alkyl or C$_{1-4}$alkoxy, and R$_{13}$ is —W$_{2a}$—Z$_1$ or

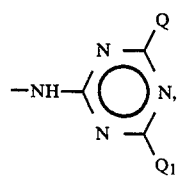

$R_{18}$ is hydrogen, cyano or carbamoyl, each $R_{19}$ is independently hydrogen; $C_{1-4}$alkyl; $C_{1-4}$alkyl monosubstituted by hydroxy or $C_{1-4}$alkoxy; or —$W_3$—$Z_1$, and $Y_d$ is —$(CH_2)_p$—$Z_1$, —CO—CH$_2$—$Z_1$ or

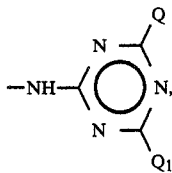

wherein each Q is independently —NH—$(CH_2)_q$—$Z_1$, each $Q_1$ is independently halo, hydroxy, amino, $C_{1-4}$alkoxy, phenoxy, phenylamino, cyclohexylamino, $C_{1-4}$alkylamino, di-($C_{1-4}$alkyl)amino or —NH—$(CH_2)_q$—$Z_1$, and $W_{2a}$ is $W_3$; linear or branched $C_{2-6}$alkenylene; linear or branched $C_{1-6}$alkylene or linear or branched $C_{2-6}$alkenylene monosubstituted by halo, hydroxy, $C_{1-4}$alkoxy or phenyl; linear or branched alkylene or linear or branched alkenylene having a maximum of 6 carbon atoms which is interrupted by a nitrogen, oxygen or sulfur atom; linear or branched alkylene or linear or branched alkenylene having a maximum of 6 carbon atoms which is monosubstituted by halo, hydroxy, $C_{1-4}$alkoxy or phenyl and interrupted by a nitrogen, oxygen or sulfur atom; —NH—$X_a$—; —CONH—$X_a$—; —NHCO—$X_a$—; —CO—$X_a$—; —SO$_2$NH—$X_a$—; —NHNHCO—$X_a$—; —CH$_2$—CONH—CH$_2$— or —CH$_2$—NHCO—CH$_2$—, wherein $X_a$ is linear or branched $C_{1-4}$alkylene or linear or branched $C_{2-4}$alkenylene, with the proviso that when $W_{2a}$ contains an $X_a$ radical, the $X_a$ radical is attached to the $Z_1$ group, wherein each $W_3$ is independently linear or branched $C_{1-6}$alkylene, each $Z_1$ is independently —$\overset{\oplus}{NR_{20}R_{21}}$, —$\overset{\oplus}{NR_{22}R_{23}R_{24}}$ A$^\ominus$, 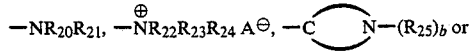 or

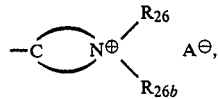

wherein each of $R_{20}$ and $R_{21}$ is independently hydrogen; $C_{1-4}$alkyl; $C_{2-4}$alkyl monosubstituted by hydroxy, $C_{1-4}$alkoxy, halo or cyano; $C_{5-6}$cycloalkyl; phenyl($C_{1-4}$alkyl) or phenyl($C_{1-4}$alkyl) the phenyl group of which is substituted by 1 to 3 substituents selected from chloro, $C_{1-4}$alkyl and $C_{1-4}$alkoxy, or —$NR_{20}R_{21}$ is

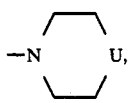

wherein U is a direct bond, —CH$_2$—, —O—, —S—, —SO—, —SO$_2$—, —NH—, —N($C_{1-4}$alkyl) or —N$^\oplus$($C_{1-4}$alkyl)$_2$ A$^\ominus$, each of $R_{22}$ and $R_{23}$ is independently $C_{1-4}$alkyl; $C_{2-4}$alkyl monosubstituted by hydroxy, $C_{1-4}$alkoxy, halo or cyano; $C_{5-6}$cycloalkyl; phenyl($C_{1-4}$alkyl) or phenyl($C_{1-4}$alkyl) the phenyl group of which is substituted by 1 to 3 substituents selected from chloro, $C_{1-4}$alkyl and $C_{1-4}$alkoxy, $R_{24}$ is $C_{1-4}$alkyl or phenyl($C_{1-4}$alkyl), or —$N^\oplus R_{22}R_{23}R_{24}$ is pyridinium, pyridinium substituted by 1 or 2 methyl groups or

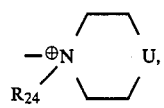

wherein $R_{24}$ and U are as defined above, $R_{25}$ is hydrogen or $C_{1-4}$alkyl, each $R_{26}$ is independently $C_{1-4}$alkyl,

is a 5- or 6-membered saturated, partially unsaturated or unsaturated protonatable heterocyclic ring, with the proviso that when it is a saturated ring, b is 1,

is a 5 or 6-membered saturated, partially unsaturated or unsaturated quaternized heterocyclic ring, with the proviso that when it is a saturated ring, b is 1, and b is 0 or 1 each p is independently 1, 2, 3 or 4, each q is independently 1, 2, 3, 4, 5 or 6, and each t is independently 0 or 1, wherein each A$^\ominus$ is independently a non-chromophoric anion, and each halo is independently fluoro, chloro, bromo or iodo, with the proviso that Ka contains 1 to 4 $Z_1$ groups and each hydroxy substituent on an alkyl group, alkylene radical or alkenylene radical attached to a nitrogen atom is attached to a carbon atom other than a carbon atom directly attached to the nitrogen atom, or a mixture thereof.

2. A metal-free compound according to claim 1, or an acid addition salt thereof.

3. A 1:1 or 1:2 metal complex according to claim 1, or an acid addition salt thereof.

4. A metal-free compound according to claim 1 having the formula

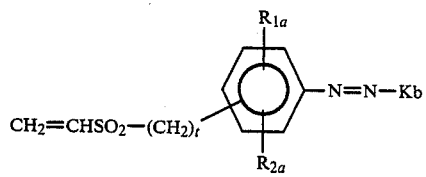

or

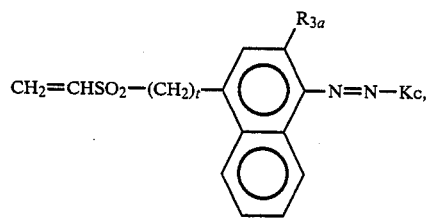

a 1:1 or 1:2 metal complex of a metallizable metal-free compound of either of said formulae or an acid addition salt of a metal-free compound of either of said formulae or of a 1:1 or 1:2 metal complex of a metallizable metal-free compound of either of said formulae, wherein Kb is

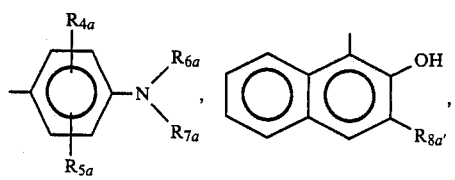

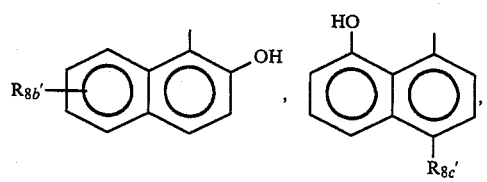

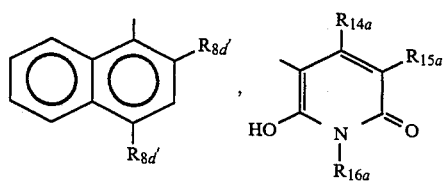

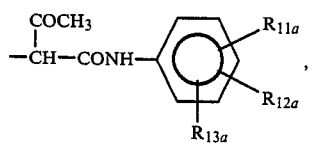

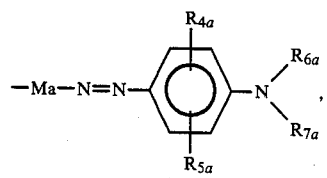

-continued

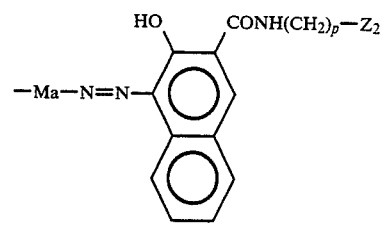 or

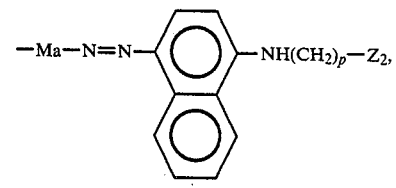

wherein Ma is

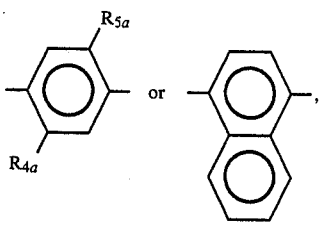

wherein $R_{4a}$ and $R_{5a}$ are as defined below, $R_{4a}$ is hydrogen, chloro, $C_{1-2}$alkyl, $C_{1-2}$alkoxy, ($C_{1-2}$alkyl)carbonylamino, ureido or —NH-CO—$(CH_2)_p$—$Z_2$, $R_{5a}$ is hydrogen, chloro, $C_{1-2}$alkyl or $C_{1-2}$alkoxy, $R_{6a}$ is hydrogen, $C_{1-2}$alkyl, benzyl, 2-hydroxyethyl, 2-chloroethyl, 2-cyanoethyl, —$W_3'$—$Z_2$, —$CH_2$—CH—$CH_2$—$Z_2$ or
     |
     OH
—$(CH_2)_r$—NHCO—$CH_2$—$Z_2$, $R_{7a}$ is hydrogen, $C_{1-2}$alkyl, benzyl, 2-hydroxyethyl, 2-chloroethyl, 2-cyanoethyl,

—$W_3'$—$Z_2$, —$CH_2$—CH—$CH_2$—$Z_2$,
     |
     OH

—$(CH_2)_r$—O—$CH_2$—CH—$CH_2$—$Z_2$,
              |
              OH

—$(CH_2)_r$—NHCO—$CH_2$—$Z_2$, —CO—$CH_2$—$Z_2$,

—$(CH_2)_r$—[pyridyl-N], —$(CH_2)_r$—[pyridyl],

—$(CH_2)_r$—[pyridyl-$N^{\oplus}$CH_3] $A^{\ominus}$ or

-continued

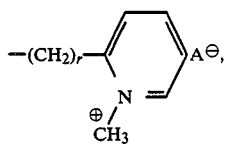

$R_{8'a}$ is —CONH—(CH$_2$)$_p$—Z$_2$ or

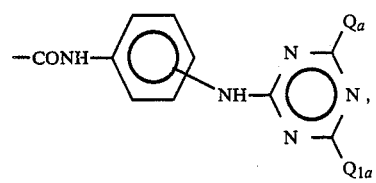

$R_{8'b}$ is —NHCO—(CH$_2$)$_p$—Z$_2$, —SO$_2$NH—(CH$_2$)$_r$—Z$_2$ or

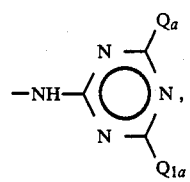

$R_{8'c}$ is —NHCO—(CH$_2$)$_u$—Z$_2$, —NH—(CH$_2$)$_r$—Z$_2$,

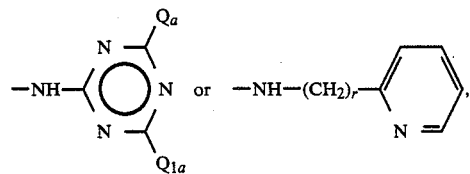

wherein u is 1, 2 or 3,
one $R_{8'd}$ is hydrogen and the other is —CONH—(CH$_2$)$_p$—Z$_2$, —NHCO—(CH$_2$)$_p$—Z$_2$, —NH—(CH$_2$)$_p$—Z$_2$ or

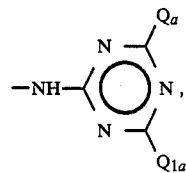

each of $R_{11a}$ and $R_{12a}$ is independently hydrogen, chloro, methyl or methoxy,
$R_{13a}$ is —NHCO—CH$_2$—Z$_2$, —CONH—(CH$_2$)$_r$—Z$_2$ or

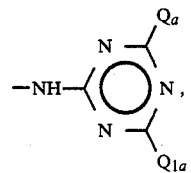

$R_{14a}$ is hydrogen, methyl, ethyl or benzyl, $R_{15a}$ is hydrogen, carbamoyl or —CH$_2$—NH—CO—CH$_2$—Z$_2$, and
$R_{16a}$ is hydrogen, C$_{1-2}$alkyl, —(CH$_2$)$_p$—Z$_2$,

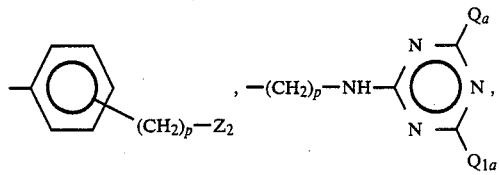

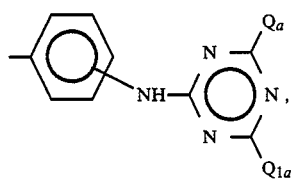

—(CH$_2$)$_p$—NHCO—(CH$_2$)$_p$—Z$_2$ or

Kc is

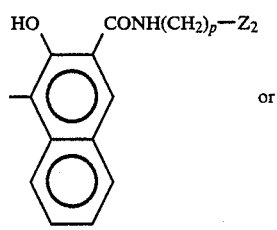

or

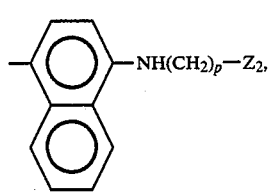

$R_{1a}$ is hydrogen; halo; C$_{1-2}$alkyl; C$_{1-2}$alkoxy; hydroxy; carboxy; cyano; phenoxy; phenoxy substituted by 1 to 3 chloro substituents; sulfamoyl; C$_{1-2}$alkylsulfamoyl; di-(C$_{1-2}$alkyl)sulfamoyl; acetamido or phenylamino, $R_{2a}$ is hydrogen, halo, C$_{1-2}$alkyl or C$_{1-2}$alkoxy, $R_{3a}$ is hydrogen or hydroxy, and t is 0 or 1, wherein each Q$_a$ is independently —NH—(CH$_2$)$_p$—Z$_2$, each Q$_{1a}$ is independently chloro, hydroxy, amino, C$_{1-2}$alkoxy, phenoxy, phenylamino or —NH—(CH$_2$)$_p$—Z$_2$, and each W$_{3'}$ is independently linear or branched C$_{1-4}$alkylene, wherein each Z$_2$ is independently —NR$_{20a}$R$_{21a}$ or —N⊕R$_{22a}$R$_{23a}$R$_{24a}$ A⊖, wherein each of R$_{20a}$ and R$_{21a}$ is independently hydrogen, C$_{1-2}$alkyl, n-C$_{2-3}$hydroxyalkyl or benzyl, or —NR$_{20a}$R$_{21a}$ is pyrrolidino, piperidino, morpholino, piperazino or N-methylpiperazino, each of $R_{22a}$ and $R_{23a}$ is independently $C_{1-2}$alkyl, n-$C_{2-3}$hydroxyalkyl or benzyl, and $R_{24a}$ is methyl, ethyl or benzyl, or —N⊕$R_{22a}R_{23a}R_{24a}$ is pyridinium, pyridinium substituted by 1 or 2 methyl groups or

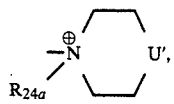

wherein U' is a direct bond, —$CH_2$—, —O—, —NH— or —$NCH_3$—, and $R_{24a}$ is as defined above, each p is independently 1, 2, 3 or 4, and each r is independently 2 or 3, wherein each $A^\ominus$ is independently a non-chromophoric anion, and each halo is independently fluoro, chloro, bromo or iodo, with the provisos that (1) $Kb$ contains 1 or 2 groups selected from $Z_2$, pyridyl-2, pyridyl-4, 1-methylpyridinium-2 $A^\ominus$ and 1-methylpyridinium-4 $A^\ominus$ and (2) any hydroxy substituent on an alkyl group attached to a nitrogen atom is attached to a carbon atom other than the carbon atom directly attached to the nitrogen atom.

5. A metal-free compound according to claim 4 having the formula

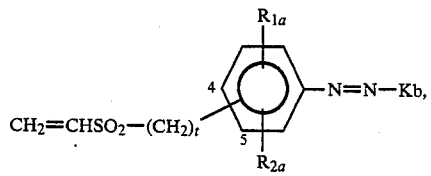

or an acid addition salt thereof.

6. A metal-free compound according to claim 5, or an acid addition salt thereof, wherein (i) $R_{1a}$ is hydrogen and $R_{2a}$ is hydrogen, (ii) one of $R_{1a}$ and $R_{2a}$ is hydrogen and the other is other than hydrogen and is in the 2-position and the $CH_2$=CH—$SO_2$—$(CH_2)_t$— group is in the 4- or 5-position or (iii) each of $R_{1a}$ and $R_{2a}$ is other than hydrogen, one of $R_{1a}$ and $R_{2a}$ is in the 2-position and the other is in the 6-position, and the $CH_2$=CH—$SO_2$—$(CH_2)_t$— group is in the 4-position.

7. A metal-free compound according to claim 4 having the formula

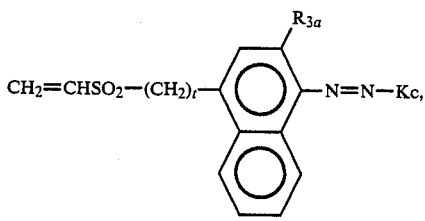

or an acid addition salt thereof.

8. A 1:1 or 1:2 metal complex according to claim 4 or an acid addition salt thereof.

9. A metal-free compound according to claim 4 having the formula

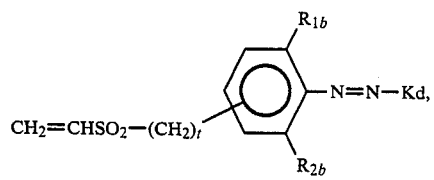

a 1:1 or 1:2 metal complex of a metallizable metal-free compound of said formula or an acid addition salt of a metal-free compound of said formula or of a 1:1 or 1:2 metal complex of a metallizable metal-free compound of said formula, wherein $Kd$ is

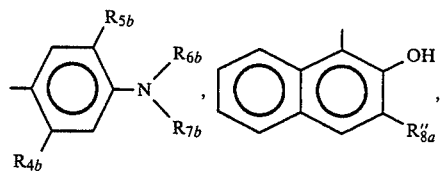

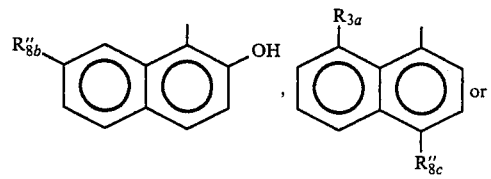

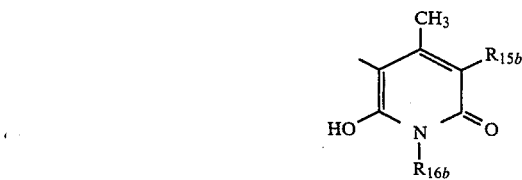

wherein $R_{3a}$ is hydrogen or hydroxy, $R_{4b}$ is hydrogen, methyl, acetamido or —NH—CO—$CH_2$—$Z_3$, $R_{5b}$ is hydrogen or $C_{1-2}$alkoxy, $R_{6b}$ is hydrogen, $C_{1-2}$alkyl, 2-hydroxyethyl, 2-cyanoethyl, —$(CH_2)_r$—$Z_3$, —$CH_2$—CH(OH)—$CH_2$—$Z_3$ or

—$CH_2CH_2$—NHCO—$CH_2$—$Z_3$, $R_{7b}$ is

—$(CH_2)_r$—$Z_3$, —$CH_2$—CH(OH)—$CH_2$—$Z_3$,

—$CH_2CH_2$—O—$CH_2$—CH(OH)—$CH_2$—$Z_3$,

—$CH_2CH_2$—NHCO—$CH_2$—$Z_2$, —CO—$CH_2$—$Z_2$,

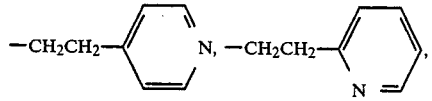

-continued

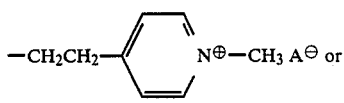

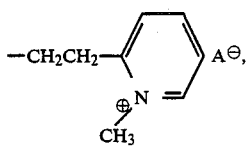

$R_8''_a$ is

—CONH—(CH$_2$)$_r$—Z$_3$ or

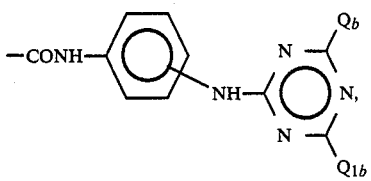

$R_8''_b$ is

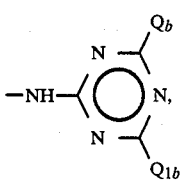

$R_8''_c$ is

—NH—(CH$_2$)$_r$—Z$_3$, —NHCO—CH$_2$—Z$_3$ or

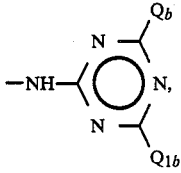

$R_{15b}$ is hydrogen, carbamoyl or —CH$_2$—NH-CO—CH$_2$—Z$_3$, and $R_{16b}$ is hydrogen, —(CH$_2$)$_r$—Z$_3$ or

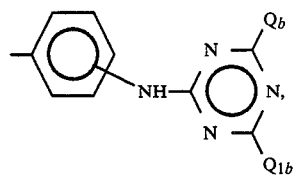

$R_{1b}$ is hydrogen, chloro, bromo, cyano, methyl or $C_{1-2}$alkoxy, $R_{2b}$ is hydrogen, chloro or bromo, and t is 0 or 1, wherein each $Q_b$ and $Q_{1b}$ is independently —NH—(CH$_2$)$_r$—Z$_3$, wherein each Z$_3$ is independently —NR$_{20b}$R$_{21b}$ or —N$^\oplus$R$_{22b}$R$_{23b}$R$_{24b}$ A$^\ominus$, wherein each of R$_{20b}$ and R$_{21b}$ is methyl or ethyl, or —NR$_{20b}$R$_{21b}$ is piperidino, morpholino, piperazino or N-methylpiperazino, each of R$_{22b}$ and R$_{23b}$ is methyl or ethyl, and R$_{24b}$ is methyl or ethyl, or —N$^\oplus$R$_{22b}$R$_{23b}$R$_{24b}$ is pyridinium, pyridinium substituted by 1 or 2 methyl groups or $$-\overset{\oplus}{\underset{R_{24b}}{N}}\diagdown\diagup U'',$$

wherein U'' is —CH$_2$—, —O—, —NH— or —NCH$_3$—, and

R$_{24b}$ is as defined above, each r is independently 2 or 3, and each Z$_2$ is independently as defined in claim 14, wherein each A$^\ominus$ is independently a non-chromophoric anion, with the proviso that Kd contains 1 or 2 groups selected from Z$_2$, Z$_3$, pyridyl-2, pyridyl-4, 1-methylpyridinium-2 A$^\ominus$ and 1-methylpyridinium-4 A$^\ominus$.

10. A metal-free compound according to claim 9, or an acid addition salt thereof.

11. A metal-free compound according to claim 10.

12. The metal-free compound according to claim 11 having the formula

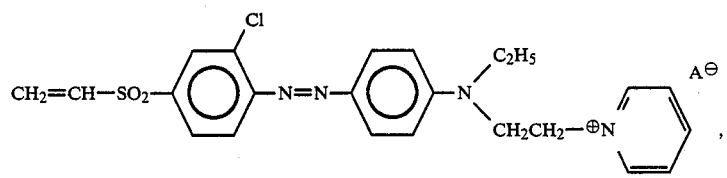

wherein A$^\ominus$ is a non-chromophoric anion.

13. The metal-free compound according to claim 11 having the formula

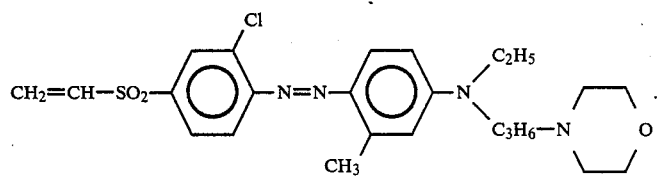

14. The metal-free compound according to claim 11 having the formula

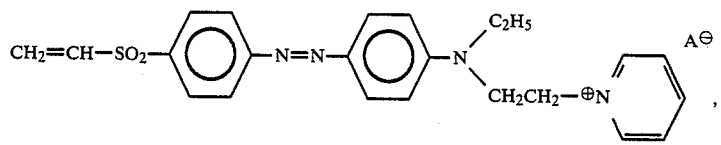
wherein A⊖ is a non-chromophoric anion.
15. The metal-free compound according to claim 11 having the formula
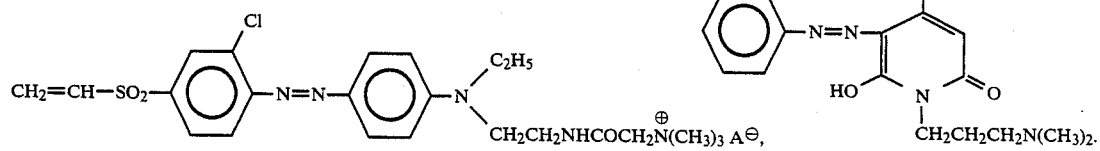
wherein A⊖ is a non-chromphoriic anion.
16. The metal-free compound according to claim 11 having the formula
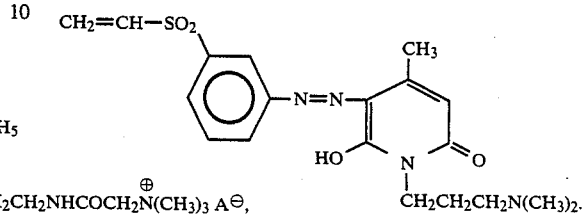
17. A 1:1 or 1:2 metal complex according to claim 9, or an acid addition salt thereof.
18. A 1:1 or 1:2 metal complex according to claim 17.
* * * * *